US012751388B2

(12) United States Patent
Yoo

(10) Patent No.: US 12,751,388 B2
(45) Date of Patent: Oct. 6, 2026

(54) PLANT CULTIVATION APPARATUS

(71) Applicant: LG ELECTRONICS INC., Seoul (KR)

(72) Inventor: Imsung Yoo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/713,786

(22) PCT Filed: Nov. 29, 2022

(86) PCT No.: PCT/KR2022/019084
§ 371 (c)(1),
(2) Date: May 28, 2024

(87) PCT Pub. No.: WO2023/096464
PCT Pub. Date: Jun. 1, 2023

(65) Prior Publication Data

US 2025/0024798 A1 Jan. 23, 2025

(30) Foreign Application Priority Data

Nov. 29, 2021 (KR) ........................ 10-2021-0167295

(51) Int. Cl.
*A01G 31/02* (2006.01)

(52) U.S. Cl.
CPC ........... *A01G 31/065* (2025.01); *A01G 31/02* (2013.01)

(58) Field of Classification Search
CPC .................................................... A01G 31/065
See application file for complete search history.

(56) References Cited

U.S. PATENT DOCUMENTS 10,638,678 B2 * 5/2020 Collier .................. A01G 31/06
2019/0110407 A1 * 4/2019 Su .......................... A01G 27/00
(Continued)

FOREIGN PATENT DOCUMENTS

CN 106818452 6/2017
EP 3516953 7/2019
(Continued)

OTHER PUBLICATIONS

International Search Report dated Mar. 17, 2023 issued in Application No. PCT/KR2022/019084.

*Primary Examiner* — Joshua D Huson
*Assistant Examiner* — Edgar Reyes
(74) *Attorney, Agent, or Firm* — KED & ASSOCIATES, LLP

(57) ABSTRACT

A plant cultivation apparatus is disclosed. A plant cultivation apparatus according to an embodiment of the present invention comprises: a cabinet; a first cultivation unit which is provided inside the cabinet and has plants placed therein; a second cultivation unit which is provided inside the cabinet to be spaced apart from the first cultivation unit and has plants placed therein; a nutrient solution supply unit which is connected to a mixing tank in which a nutrient solution is stored and which supplies the nutrient solution to the first cultivation unit; a nutrient solution delivery unit which is provided in the first cultivation unit and delivers, to the second cultivation unit, the nutrient solution supplied to the first cultivation unit; and a nutrient solution recovery unit which is provided in the second cultivation unit and recovers, into the mixing tank, the nutrient solution supplied to the second cultivation unit.

20 Claims, 14 Drawing Sheets

(56) References Cited

U.S. PATENT DOCUMENTS

| | | | | |
|---|---|---|---|---|
| 2019/0141923 | A1* | 5/2019 | Ray, Jr. | F21V 29/70<br>47/62 R |
| 2019/0335691 | A1* | 11/2019 | Krakover | A01G 31/06 |
| 2020/0260665 | A1* | 8/2020 | Yi | A01G 27/003 |
| 2020/0260668 | A1* | 8/2020 | Choi | A01G 31/02 |
| 2020/0305372 | A1* | 10/2020 | Kondorf | A01G 31/06 |
| 2021/0169027 | A1* | 6/2021 | Raymond | A47B 37/00 |
| 2021/0224979 | A1* | 7/2021 | Hunter | G06T 7/64 |
| 2022/0104443 | A1* | 4/2022 | Chang | A01K 63/04 |
| 2022/0124996 | A1* | 4/2022 | Shamir | A01G 31/06 |
| 2022/0192114 | A1* | 6/2022 | Lee | A01G 31/047 |

FOREIGN PATENT DOCUMENTS

| | | |
|---|---|---|
| JP | 2019-090573 | 5/2012 |
| JP | 2019-154348 | 9/2019 |
| KR | 10-2014-0049249 | 4/2014 |
| KR | 10-2019-0132078 | 11/2019 |

* cited by examiner

PLANT CULTIVATION APPARATUS

CROSS-REFERENCE TO RELATED PATENT APPLICATIONS

This application is a U.S. National Stage Application under 35 U.S.C. § 371 of PCT Application No. PCT/KR2022/019084, filed Nov. 29, 2022, which claims priority to Korean Patent Application No. 10-2021-0167295, filed Nov. 29, 2021, whose entire disclosures are hereby incorporated by reference.

TECHNICAL FIELD

The present disclosure relates to a plant cultivation apparatus, which can provide plants with a nutrient solution mixed with water and nutrients.

BACKGROUND ART

A plant cultivation apparatus refers to a device that enables the cultivation of plants by artificially supplying and controlling the light energy, moisture, soil, temperature, and the like necessary for plant growth. A plant cultivation apparatus includes a cultivation space that creates an environment suitable for plant growth, and plants grow within the cultivation space.

A plant cultivation apparatus may include a component for supplying moisture and nutrients for plant growth, and may also include a component for supplying light energy to the plant. Accordingly, plants may be cultivated in the plant cultivation apparatus even if they are not provided with light from the sun.

The plant cultivation apparatus may include a flow path for supplying a nutrient solution containing moisture and nutrients for plant growth to the plants. The nutrient solution may be stored in a tank provided in the plant cultivation apparatus, and the nutrient solution may flow along a flow path extending from the tank and be supplied to the plants.

In relation to this, in reference EP 03516953 A1, a plant cultivation apparatus including a plurality of cultivation units in which plants are disposed is disclosed. In the plant cultivation apparatus in the reference, a flow path for supplying nutrient solution is provided in each cultivation unit.

In the plant cultivation apparatus in the reference, nutrient solution is supplied to each cultivation unit through a nutrient solution supply flow path provided for each cultivation unit, and as a result, more nutrient solution than the amount of nutrient solution consumed by the plant is supplied to each cultivation unit and thus the amount of nutrient solution provided may be unnecessarily increased.

In addition, the nutrient solution provided to the cultivation unit may be recovered back to the mixing tank, and in this case, the plant cultivation apparatus in the reference requires a recovery flow path for each cultivation unit, making the configuration and design complicated and reducing space utilization inside the cabinet.

Furthermore, a complex structure is required because a plurality of valves are required to determine whether to supply the nutrient solution to each cultivation unit or to determine whether to recover the nutrient solution provided to the cultivation unit.

In other words, it is an important task in this technical field to efficiently provide plants with nutrient solution for plant growth and to develop a simple and effective structure for supply and recovery of nutrient solution from the cultivation unit to grow plants.

DISCLOSURE

Technical Problem

An object of embodiments of the present disclosure is to provide a plant cultivation apparatus that can efficiently supply nutrient solution to plants.

In addition, an object of embodiments of the present disclosure is to provide a plant cultivation apparatus that has a simple and efficient nutrient solution supply structure by providing an efficient flow path for the nutrient solution.

Additionally, an object of embodiments of the present disclosure is to provide a plant cultivation apparatus that can effectively supply nutrient solution to plants present in a plurality of cultivation units using an appropriate amount of nutrient solution.

Additionally, an object of embodiments of the present disclosure is to provide a plant cultivation apparatus that has a structure capable of effectively recovering the nutrient solution supplied to each cultivation unit.

Additionally, an object of embodiments of the present disclosure is to provide a plant cultivation apparatus in which nutrient solution can be efficiently bypassed for each of the plurality of cultivation units.

Technical Solution

Embodiments of the present disclosure have a stepped circulating water supply system and enable efficient use of a nutrient solution with a simple structure in a home plant cultivation apparatus based on hydroponic cultivation.

Embodiments of the present disclosure have an interlocked water supply and drainage system for a plurality of cultivation units, rather than an individual water supply and drainage system for each cultivation unit, and the nutrient solution supplied to the upper cultivation unit is drained to the lower cultivation unit at the same time as water supply, thereby water supply to the lower cultivation unit.

Additionally, in embodiments of the present disclosure, when plants are not cultivated in a specific cultivation unit, the nutrient solution may be bypassed in the specific cultivation unit for sanitary management of the nutrient solution and efficiency of cultivation.

In the cultivation unit, an overflow hole is formed at a specific location in the cultivation unit so that the water supply level is always constant for a uniform growth environment for plants, so that the water supply level may be adjusted.

In other words, one embodiment of the present disclosure has a structure that allows sequential water supply to multi-stage cultivation units through one pump and supply flow path, and may be reflected by a drain in the cultivation unit and an overflow hole for maintaining a constant water level.

The plant cultivation apparatus according to one embodiment of the present disclosure includes a cabinet, a first cultivation unit, a second cultivation unit, a nutrient solution supply unit, a nutrient solution transferring unit, and a nutrient solution recovery unit.

The first cultivation unit is provided inside the cabinet and plants are placed therein. The second cultivation unit is provided inside the cabinet to be spaced apart from the first cultivation unit, and plants are placed therein.

The nutrient solution supply unit is connected to a mixing tank in which the nutrient solution is stored and supplies the nutrient solution to the first cultivation unit, and the nutrient solution transferring unit is provided in the first cultivation unit and transfers the nutrient solution supplied to the first cultivation unit to the second cultivation unit, and a nutrient solution recovery unit is provided in the second cultivation unit to recover the nutrient solution supplied to the second cultivation unit to the mixing tank.

The nutrient solution supply unit includes a supply hole through which the nutrient solution is discharged, and an embodiment of the present disclosure may further include a first inlet provided in the first cultivation unit and located below the supply hole to receive the nutrient solution falling from the supply hole and supply the nutrient solution to the inside of the first cultivation unit.

The first inlet may be provided to be detachable from the first cultivation unit, and the nutrient solution falling from the supply hole may be bypassed and supplied to the nutrient solution transferring unit when the first inlet is removed from the first cultivation unit.

At least a portion of the nutrient solution transferring unit may be located below the first inlet mounted on the first cultivation unit, so that when the first inlet is removed, the nutrient solution transferring unit receives the nutrient solution which bypasses the first cultivation unit and falls and supplies the nutrient solution to the second cultivation unit.

The first cultivation unit may include a first discharge hole through which the inner nutrient solution is discharged to the outside, and the nutrient solution transferring unit may include a first collection unit. The first collection unit may include a first general collection area located below the first discharge hole so that the nutrient solution falling from the first discharge hole is collected and a first additional collection area located below the first inlet mounted on the first cultivation unit so that the nutrient solution which bypasses the first cultivation unit and falls is collected.

The second cultivation unit may be located below the first cultivation unit, and the nutrient solution transferring unit may transfer the nutrient solution from the first cultivation unit to the second cultivation unit using the self-weight of the nutrient solution.

The nutrient solution transferring unit may include a first collection unit located below the first cultivation unit to collect the nutrient solution discharged from the first cultivation unit; and a transferring flow path extending downward from the first collection unit through which the nutrient solution collected in the first collection unit flows toward the second cultivation unit.

An embodiment of the present disclosure may further include a second inlet provided in the second cultivation unit and located below the transferring flow path to receive the nutrient solution discharged from the transferring flow path and supply the nutrient solution to the inside of the second cultivation unit.

The second inlet may be provided to be detachable from the second cultivation unit, and the nutrient solution falling from the transferring flow path may be bypassed and supplied to the nutrient solution recovery unit when the second inlet is removed from the second cultivation unit.

The second cultivation unit may include a second discharge hole through which the inner nutrient solution is discharged to the outside, and the nutrient solution recovery unit may include a second collection unit.

The second collection unit may include a second collection area located below the second discharge hole so that the nutrient solution falling from the second discharge hole is collected, and a second additional collection area located below the second inlet mounted on the second cultivation unit so that the nutrient solution that passes and falls is collected.

The first cultivation unit may include a first discharge hole through which the nutrient solution is discharged to the outside of the first cultivation unit, and at least a portion of the nutrient solution transferring unit may be located below the first discharge hole, collect the nutrient solution falling from the first discharge hole, and transfer the nutrient solution to the second cultivation unit.

The first cultivation unit may include a first accommodation space in which the nutrient solution supplied from the nutrient solution supply unit is stored, and the first discharge hole may include a first general hole located at the lowest portion of the first accommodation space and a first overflow hole located above the first general hole and configured to discharge a nutrient solution by the standard water level or more of the first accommodation space.

The first cultivation part may be inclined upward as it moves away from the lowest portion and may include an inclined part in which the first general hole and the first overflow hole are provided.

The total amount of the nutrient solution per standard hour discharged through the first general hole of the first discharge hole may be smaller than the total amount of the nutrient solution per standard hour supplied from the nutrient solution supply unit. The diameter of the first general hole may be smaller than the diameter of the first overflow hole.

The first cultivation unit may be provided with a first accommodation space that accommodates the nutrient solution supplied from the nutrient solution supply unit and a first peripheral wall extending along the perimeter of the first accommodation space, and at least a portion of the first inlet may extend outward from the first peripheral wall and may be located below the supply hole.

The first inlet may include a shielding unit configured to shield at least a portion of the open upper surface of the first accommodation space. The first accommodation space may include a container space in which a cultivation container containing at least a portion of the plant is seated, and the shielding unit may be disposed to shield the open upper surface of the remaining space in the first accommodation space except for the container space.

A cultivation container of the first cultivation unit containing at least a portion of the plant may be accommodated in the first accommodation space, and the entire open upper surface of the first accommodation space may be shielded by the shielding unit and the cultivation container.

The first inlet may further include a recessed space located below the supply hole of the nutrient solution supply unit on the outside of the first circumferential wall, and an inlet flow path provided below the shielding unit to communicate with the recessed space and the first accommodation space.

The inlet flow path may protrude downward from the shielding unit and extend from the recessed space toward the first accommodation space, and a first flow path groove into which the inlet flow path is inserted from above may be formed in the first peripheral wall.

The first accommodation space may include a container space in which a cultivation container containing at least a portion of the plant is seated, and the inlet flow path may be connected to the remaining spaces in the first accommodation space excluding the container space.

Meanwhile, a plant cultivation apparatus according to an embodiment of the present disclosure may include a cabinet; a first cultivation unit provided inside the cabinet and in which plants are placed; a second cultivation unit provided in the cabinet to be spaced apart from the first cultivation unit, and in which plants are placed; a mixing tank configured to store nutrient solution to be supplied to the plants of the first cultivation unit and the second cultivation unit; and a circulation supply unit connected to the mixing tank and configured to circulate and supply the nutrient solution of the mixing tank to the first cultivation unit, the second cultivation unit, and the mixing tank in that order.

In addition, a plant cultivation apparatus according to an embodiment of the present disclosure may a cabinet; a first cultivation unit provided inside the cabinet and in which plants are placed; a second cultivation unit provided in the cabinet to be spaced apart from the first cultivation unit, and in which plants are placed; a nutrient solution supply unit connected to a mixing tank in which the nutrient solution is stored and configured to supply the nutrient solution to the first cultivation unit; and a first inlet provided to be detachable from the first cultivation unit and configured to transfer the nutrient solution supplied from the nutrient solution supply unit to the inside of the first cultivation unit, in which the first cultivation unit may be equipped with the first inlet so that the nutrient solution of the nutrient solution supply unit flows into the inside thereof, and the first inlet may be removed so that the nutrient solution of the nutrient solution supply unit is bypassed and transferred to the second cultivation unit.

Advantageous Effect

Embodiments of the present disclosure may provide a plant cultivation apparatus that can efficiently supply nutrient solution to plants.

Additionally, embodiments of the present disclosure may provide a plant cultivation apparatus with a simple and efficient nutrient solution supply structure by providing an efficient flow path for the nutrient solution.

Additionally, embodiments of the present disclosure may provide a plant cultivation apparatus that may effectively supply nutrient solution to plants present in a plurality of cultivation units using an appropriate amount of nutrient solution.

Additionally, embodiments of the present disclosure may provide a plant cultivation apparatus having a structure capable of effectively recovering the nutrient solution supplied to each cultivation unit.

Additionally, embodiments of the present disclosure may provide a plant cultivation apparatus in which nutrient solution may be efficiently bypassed for each of the plurality of cultivation units.

BEST MODE

Figure 1:
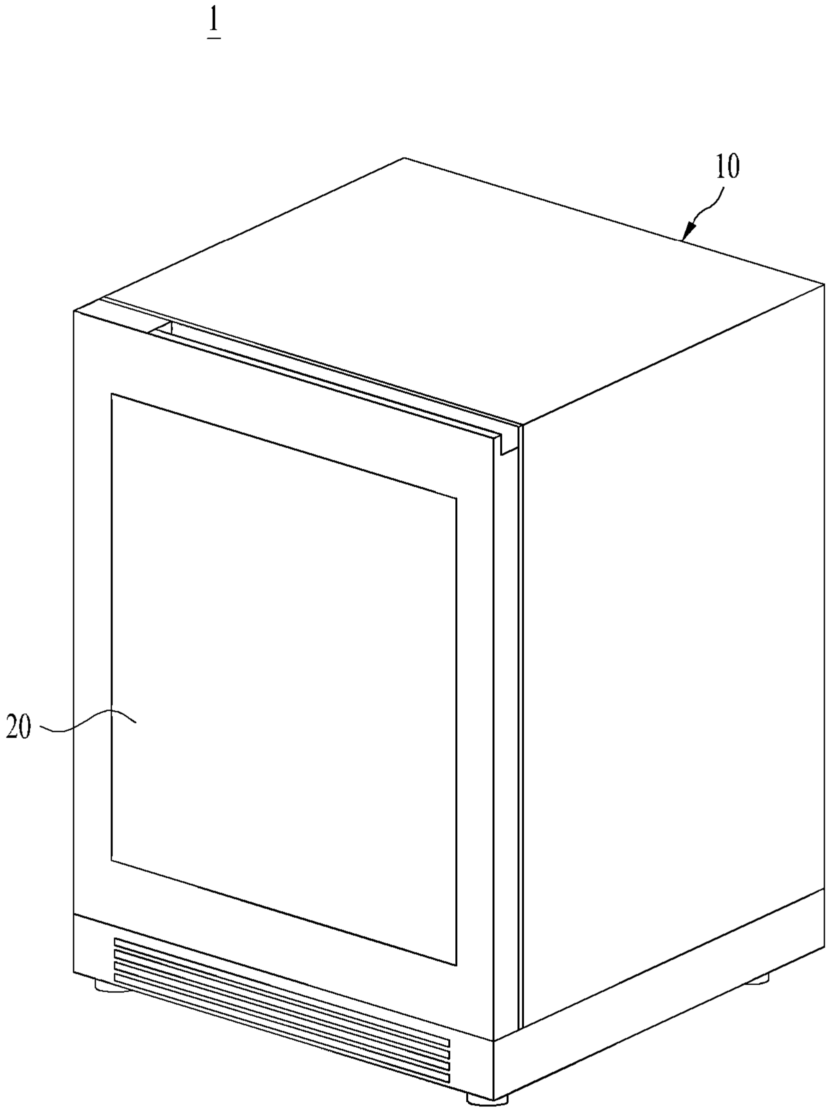
FIG. 1 is a perspective view illustrating a plant cultivation apparatus according to an embodiment of the present disclosure.

Below, with reference to the attached drawings, embodiments of the present disclosure will be described in detail so that those skilled in the art can easily implement the present disclosure.

However, the present disclosure may be implemented in many different forms and is not limited to the embodiments described herein. In order to clearly explain the present disclosure in the drawings, portions unrelated to the description are omitted, and similar portions are given similar reference numerals throughout the specification.

In this specification, duplicate descriptions of the same components are omitted.

Also, in this specification, when a component is mentioned as being 'connected' or 'joined' to another component, it may be directly connected or joined to the other component, but it should be understood that the other components may exist in between. On the other hand, in this specification, when it is mentioned that a component is 'directly connected' or 'directly joined' to another component, it should be understood that there are no other components in between.

Additionally, the terms used in this specification are merely used to describe specific embodiments and are not intended to limit the present disclosure.

Also, in this specification, singular expressions may include plural expressions, unless the context clearly dictates otherwise.

In addition, in this specification, terms such as 'include' or 'have' are only intended to designate the presence of features, numbers, steps, operations, components, parts, or combinations thereof described in the specification, and it should be understood that this does not exclude in advance the presence or addition of one or more other features, numbers, steps, operations, components, parts, or combinations thereof.

Also, in this specification, the term 'and/or' includes a combination of a plurality of listed items or any of the plurality of listed items. In this specification, 'A or B' may include 'A', 'B', or 'both A and B'.

FIG. 1 illustrates the outer appearance of a plant cultivation apparatus 1 according to an embodiment of the present disclosure. Referring to FIG. 1, a plant cultivation apparatus 1 according to an embodiment of the present disclosure includes a cabinet 10.

The cabinet 10 may include various configurations for placing plants therein and providing light, water, nutrients, and the like to the plants. A cultivation space for plants to grow may be formed inside the cabinet 10.

The cabinet 10 may have various shapes. Although FIG. 1 illustrates a cabinet 10 in the shape of a hexahedron, it is not necessarily limited thereto.

The cabinet 10 has an opening formed on one side so that the cultivation space and the outside may communicate. In other words, the cultivation space of the cabinet 10 may be exposed to the outside through the opening. The opening may be provided in various positions such as the front surface, upper surface, and side, and FIG. 1 illustrates the opening formed on the front surface according to an embodiment of the present disclosure.

Meanwhile, the cabinet 10 may be provided with a door 20 for opening and closing the opening exposing the cultivation space to the outside. The door 20 is coupled to the cabinet 10 and may selectively open or shield the opening.

The door 20 is rotatably provided on the cabinet 10 to open and close the opening of the cabinet 10. For example, the door 20 may be rotated away from the opening to expose the cultivation space of the cabinet 10 to the outside and may be rotated toward the opening to block the cultivation space from the outside.

Figure 2:
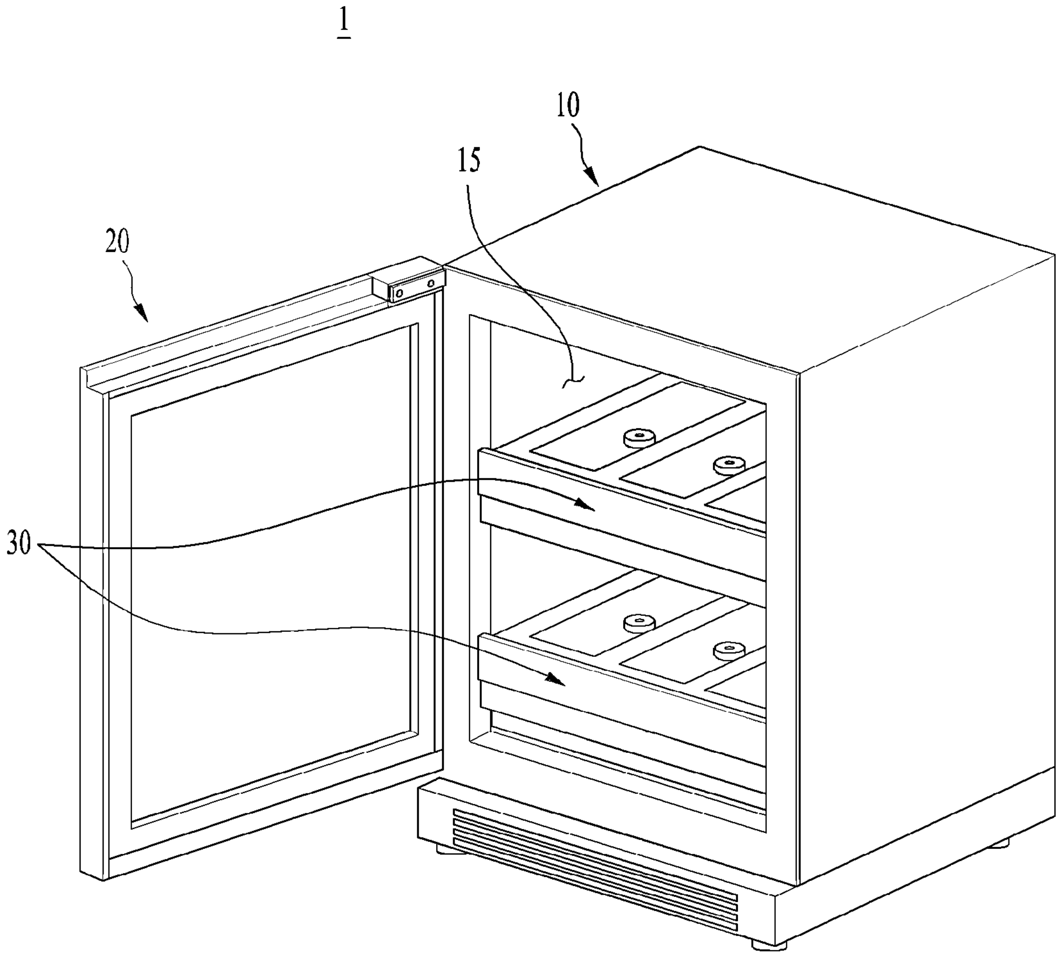
FIG. 2 is a perspective view illustrating a state where the door of the plant cultivation apparatus is open according to an embodiment of the present disclosure.

FIG. 2 illustrates the plant cultivation apparatus 1 according to an embodiment of the present disclosure in which the door 20 is opened and the cultivation space is exposed to the outside.

Referring to FIG. 2, one embodiment of the present disclosure may be provided with a cultivation unit 30 in which plants are placed in a cultivation space defined inside the cabinet 10. The cultivation unit 30 has a shape such as a panel on which plants are seated, and a plurality of cultivation units may be provided in a multi-stage form.

Specifically, the cultivation unit 30 may be provided in the shape of a panel parallel to the ground and placed in the cultivation space, and a plurality of cultivation units may be provided and spaced apart in the vertical direction to form the multi-stage structure.

FIG. 2 illustrates a plant cultivation apparatus 1 including two cultivation units 30 according to an embodiment of the present disclosure, but the number of cultivation units 30 may be determined in various ways according to need.

Figure 3:
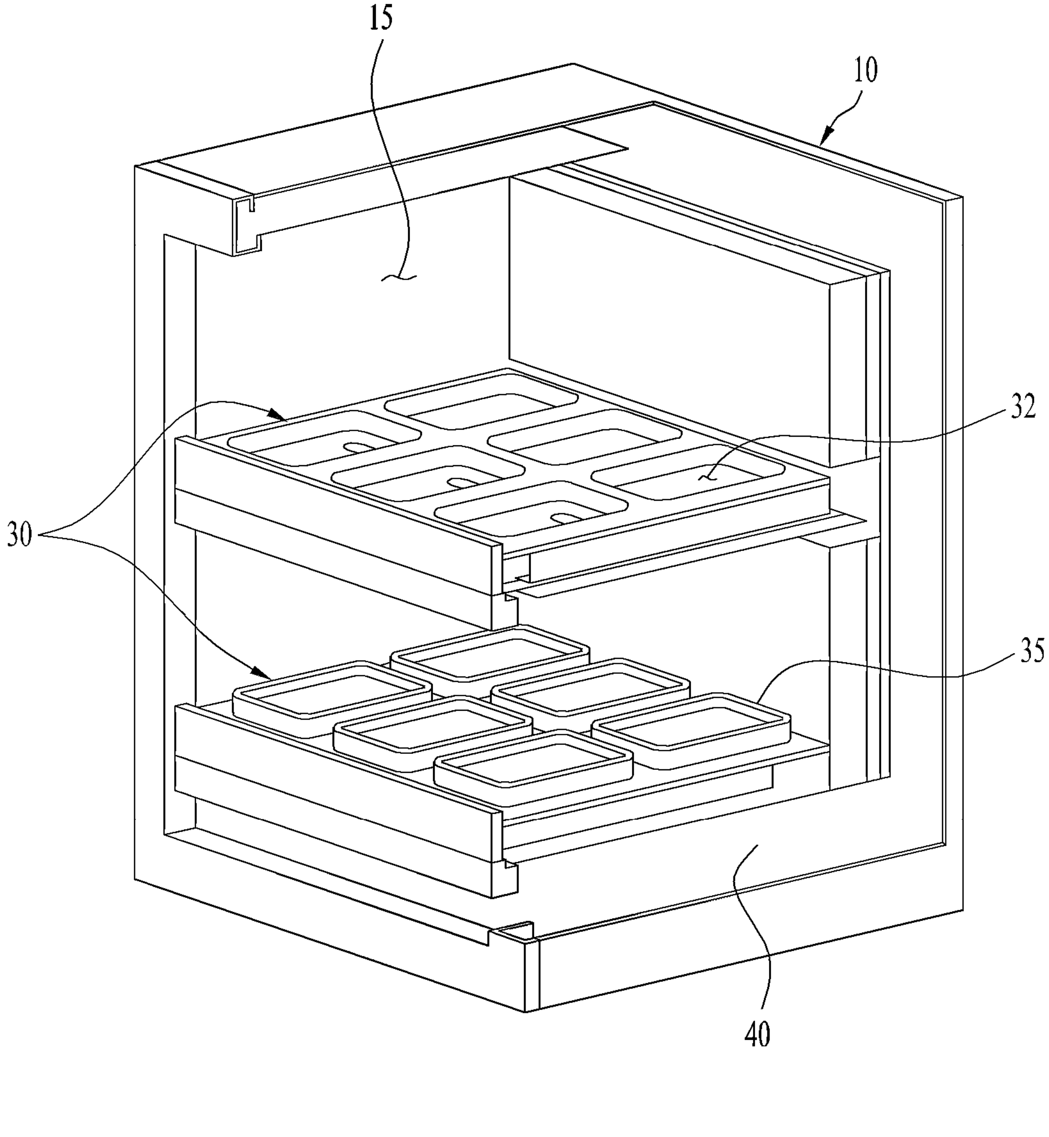
FIG. 3 is a diagram illustrating the cultivation space inside the cabinet in the plant cultivation apparatus according to an embodiment of the present disclosure.

Meanwhile, FIG. 3 illustrates a cultivation space defined inside the plant cultivation apparatus 1 according to an embodiment of the present disclosure.

Referring to FIG. 3, each of the plurality of cultivation units 30 may include a container space 32 in which a cultivation container 35 containing at least a portion of a plant is accommodated. The user may directly place plants in the cultivation unit 30 or insert and install the cultivation container 35 into the container space 32.

In the cultivation unit 30, the container space 32 may be defined through a downwardly recessed groove, and a plurality of container spaces 32 may be provided and spaced apart from each other. In FIG. 3, the container space 32 is illustrated with the cultivation container 35 removed from the cultivation unit 30 located on the upper side, and a state where the cultivation container 35 is installed in the cultivation unit 30 located on the lower side is illustrated.

Figure 4:
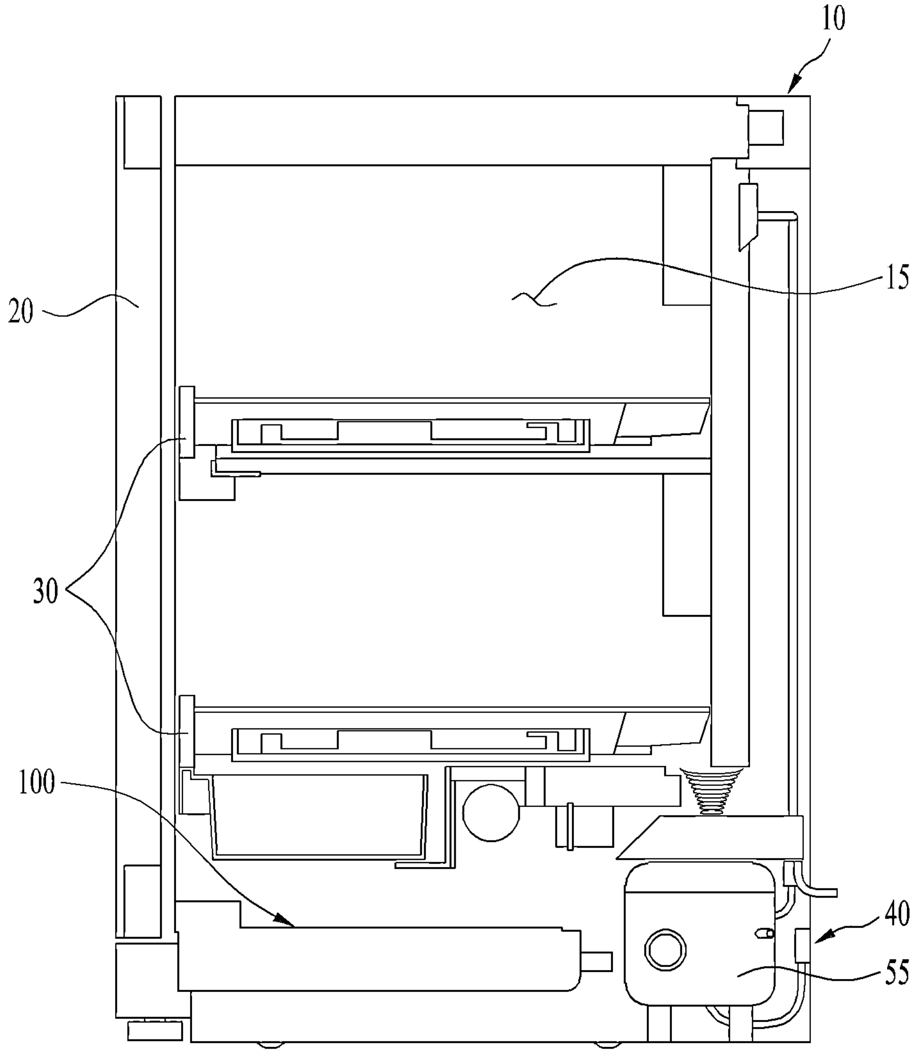
FIG. 4 is a cross-sectional view illustrating the interior of a plant cultivation apparatus according to an embodiment of the present disclosure.

FIG. 4 illustrates a cross-section illustrating the interior of a plant cultivation space according to an embodiment of the present disclosure.

Referring to FIG. 4, the plant cultivation apparatus 1 according to an embodiment of the present disclosure may be separated from the cultivation space where plants grow, and may include a machine room 40 including a mixing tank 50 and a supply pump 55, which will be described later.

The location of the machine room 40 may vary, and FIG. 4 illustrates a plant cultivation apparatus 1 in which the machine room 40 with a large load is disposed below the cabinet 10 according to an embodiment of the present disclosure.

The machine room 40 may be equipped with at least a part of a temperature adjustment system or a light amount adjustment system for adjusting the air temperature of the cultivation space, in addition to a part of the circulation supply unit such as the mixing tank 50 and the supply pump 55.

Figure 5:
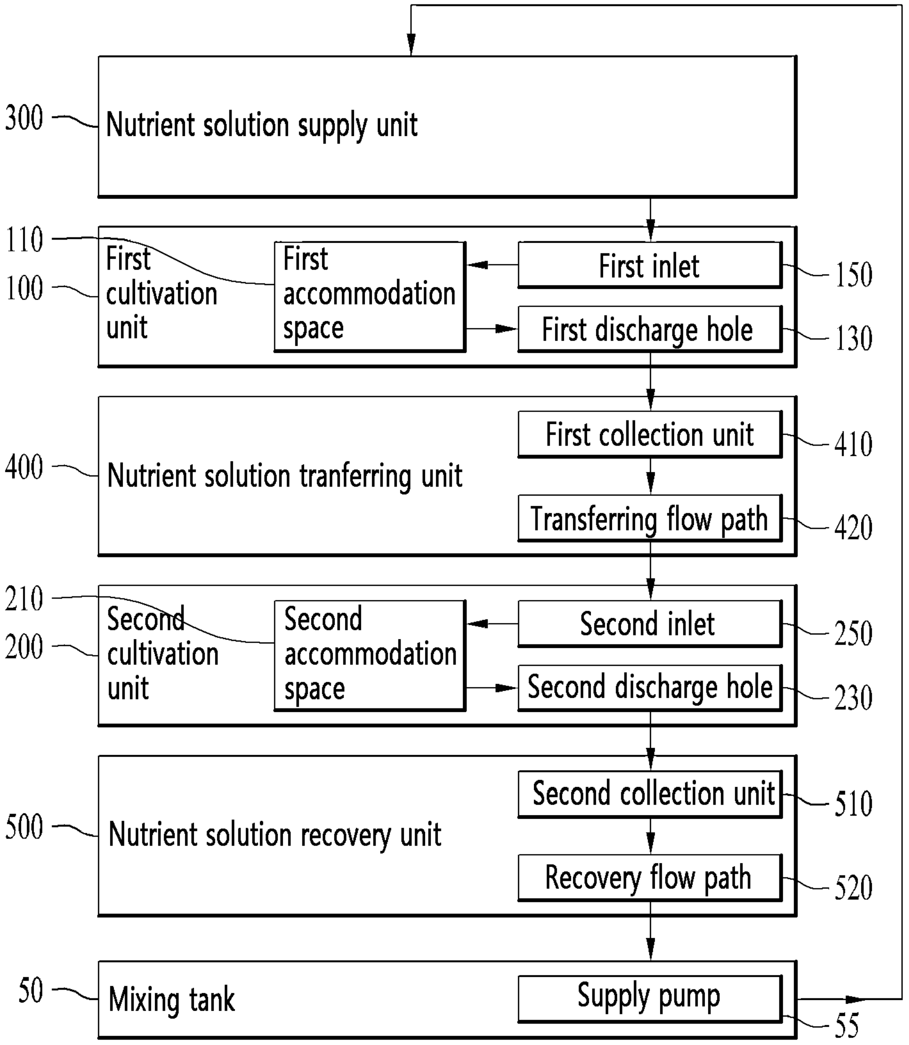
FIG. 5 is a block diagram illustrating the circulation process of nutrient solution in a plant cultivation apparatus according to an embodiment of the present disclosure.

Meanwhile, FIG. 5 conceptually illustrates each configuration through which the nutrient solution flows and the circulation path of the nutrient solution in an embodiment of the present disclosure.

Referring to FIG. 5, one embodiment of the present disclosure may include a circulation supply system or a circulation supply unit in which the nutrient solution flowing from the mixing tank 50 flows through the first cultivation unit 100 and the second cultivation unit 200 and returns to the mixing tank 50.

In one embodiment of the present disclosure, the nutrient solution may be supplied from the mixing tank 50 to the nutrient solution supply unit 300, the first cultivation unit 100, the nutrient solution transferring unit 400, the second cultivation unit 200, and the nutrient solution recovery unit 500 and then be recovered back to the mixing tank 50.

Specifically, in one embodiment of the present disclosure, the nutrient solution may flow from the mixing tank 50 through the supply pump 55 along the nutrient solution supply unit 300 and be provided to the first cultivation unit 100. The nutrient solution provided to the first cultivation unit 100 may be transferred to the nutrient solution transferring unit 400 via the first inlet 150, the first accommodation space 110, and the first discharge hole 130 of the first cultivation unit 100.

The nutrient solution provided to the nutrient solution transferring unit 400 may be transferred to the second cultivation unit 200 via the first collection unit 410 and the transferring flow path 420.

The nutrient solution provided to the second cultivation unit 200 may be transferred to the nutrient solution recovery unit 500 via the second inlet 250, the second accommodation space 210, and the second discharge hole. The nutrient solution from the nutrient solution recovery unit 500 may be recovered back to the mixing tank 50 via the second collection unit 510 and the recovery flow path 520.

Figure 6:
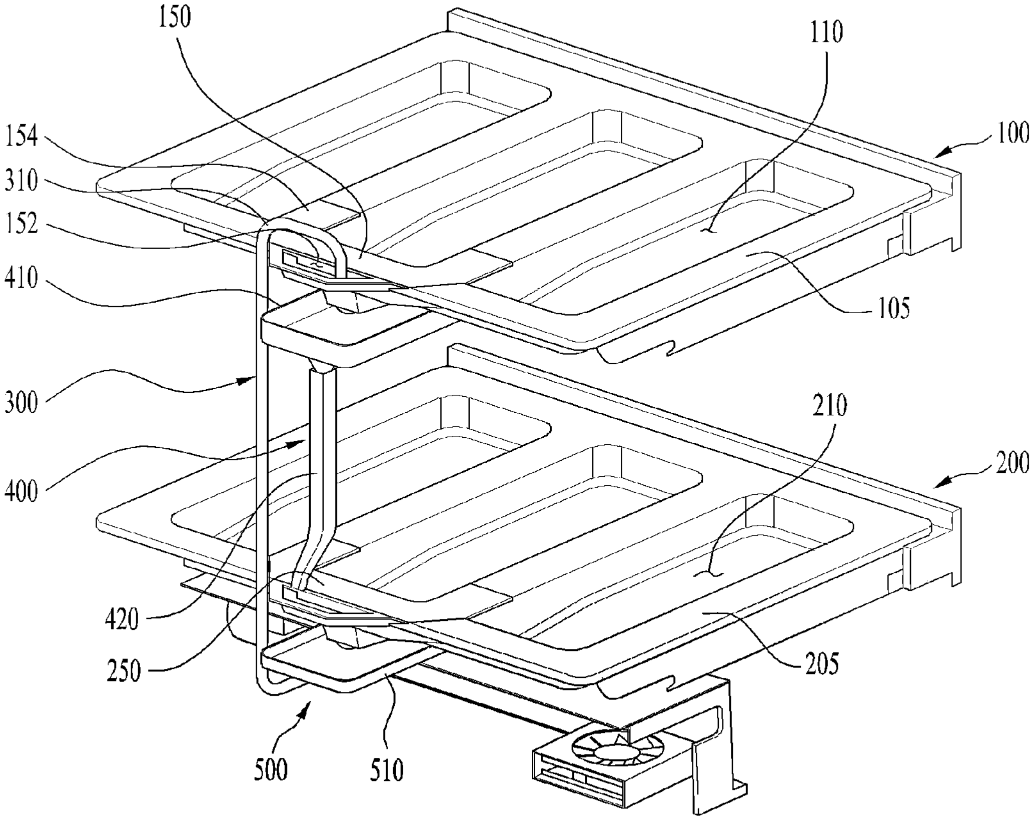
FIG. 6 is a perspective view illustrating the cultivation unit and circulation supply unit in one embodiment of the present disclosure.
Figure 7:
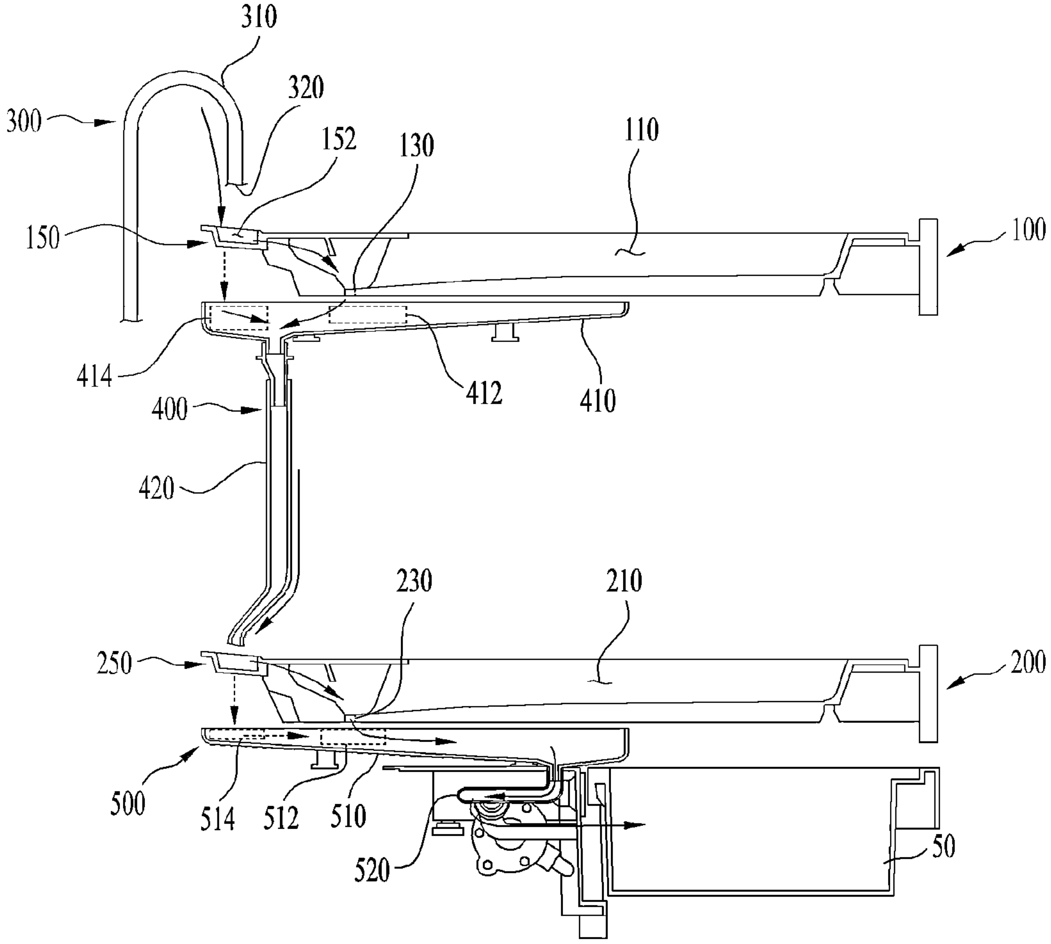
FIG. 7 is a cross-sectional view illustrating the cultivation unit and circulation supply unit in one embodiment of the present disclosure.

Meanwhile, FIG. 6 illustrates the nutrient solution supply unit 300, the nutrient solution transferring unit 400, and the nutrient solution recovery unit 500 of the plant cultivation apparatus 1 according to an embodiment of the present disclosure, and FIG. 7 illustrates a cross-sectional view illustrating the nutrient solution supply unit 300, the nutrient solution transferring unit 400, and the nutrient solution recovery unit 500.

Referring to FIGS. 6 and 7, one embodiment of the present disclosure may include a circulation supply unit which includes a nutrient solution supply unit 300, a nutrient solution transferring unit 400, and a nutrient solution recovery unit 500, and which supplies nutrient solution to a first cultivation unit 100 and a second cultivation unit.

Specifically, the plant cultivation apparatus 1 according to an embodiment of the present disclosure may include a cabinet 10, a first cultivation unit 100, a second cultivation unit 200, a nutrient solution supply unit 300, a nutrient solution transferring unit 400, and a nutrient solution recovery unit 500.

The first cultivation unit 100 is provided inside the cabinet 10, and plants may be placed in the first cultivation unit. The second cultivation unit 200 is provided inside the cabinet 10 to be spaced apart from the first cultivation unit 100, and plants can be placed in the second cultivation unit.

The nutrient solution supply unit 300 is connected to the mixing tank 50 in which the nutrient solution is stored and may supply the nutrient solution to the first cultivation unit 100. The nutrient solution transferring unit 400 is provided in the first cultivation unit 100 and may transfer the nutrient solution supplied to the first cultivation unit 100 to the second cultivation unit 200. The nutrient solution recovery unit 500 is provided in the second cultivation unit 200 and may recover the nutrient solution supplied to the second cultivation unit 200 to the mixing tank 50.

More specifically, an embodiment of the present disclosure may include a plurality of cultivation units 30, and the plurality of cultivation units 30 may include a first cultivation unit 100 and a second cultivation unit 200.

The first cultivation unit 100 and the second cultivation unit 200 are separated and spaced apart from each other so that plants may be placed and grown therein. The first cultivation unit 100 and the second cultivation unit 200 may each include a container space 32 in which plants or cultivation containers 35 containing plants are located.

The first cultivation unit 100 may include a first accommodation space 110 in which the nutrient solution is accommodated, and the second cultivation unit 200 may include a second accommodation space 210 in which the nutrient solution is accommodated. The nutrient solution supplied through the nutrient solution supply unit 300 may be stored in the first accommodation space 110 of the first cultivation unit 100.

The nutrient solution in the first accommodation space 110 may be stored in the second accommodation space 210 of the second cultivation unit 200 through the nutrient solution transferring unit 400. The nutrient solution stored in the second accommodation space 210 of the second cultivation unit 200 may be recovered back to the mixing tank 50 through the nutrient solution recovery unit 500.

The nutrient solution stored in the mixing tank 50 may be a mixed solution of water and nutrients. The nutrient solution may be premixed outside the plant cultivation apparatus 1 and provided to the mixing tank 50, or may be mixed inside the mixing tank 50.

The nutrient solution supply unit 300 is connected to the mixing tank 50 so that the nutrient solution in the mixing tank 50 may flow therein. For example, the nutrient solution supply unit 300 may include a supply flow path 310 extending from the mixing tank 50 toward the first cultivation unit 100 and a supply pump 55 that flows the nutrient solution. The nutrient solution in the mixing tank 50 may be provided to the first cultivation unit 100 through the nutrient solution supply unit 300.

The nutrient solution transferring unit 400 may be connected to the first cultivation unit 100. The nutrient solution transferring unit 400 may be directly connected to the first cultivation unit 100 or may be indirectly connected through a separate configuration corresponding to a medium.

In addition, the nutrient solution transferring unit 400 may be a means for transferring the nutrient solution of the first cultivation unit 100 to the second cultivation unit 200 on the flow path of the nutrient solution in a state of being spaced apart from the first cultivation unit 100. In other words, the nutrient solution transferring unit 400 may be a means for conceptually connecting the first cultivation unit 100 and the second cultivation unit 200 based on the flow path of the nutrient solution.

The nutrient solution supplied to the first cultivation unit 100 through the nutrient solution supply unit 300 is provided to the plants of the first cultivation unit 100, and the nutrient solution from the first cultivation unit 100 is transferred to the second cultivation unit 200 through the nutrient solution transferring unit and thus may be provided to the plants of the second cultivation unit 200.

When a flow path for supplying the nutrient solution is provided by respectively connecting the first cultivation unit 100 and the second cultivation unit 200 to the mixing tank 50, the first cultivation unit 100 and the second cultivation unit 200 may be provided with a nutrient solution to fill the first accommodation space 110 and the second accommodation space 210, respectively, and considering the absorption amount of the plant, an unnecessarily large amount of nutrient solution may be provided to each of the first accommodation space 110 and the second accommodation space 210.

Accordingly, the amount of nutrient solution circulated throughout the plant cultivation apparatus 1 may be increased, and the minimum level of the nutrient solution required in the mixing tank 50 may be unnecessarily increased, and the minimum level of the nutrient solution required in the mixing tank 50 may be unnecessarily increased, and the impurities generated while passing through plants or soil materials may increase, and the nutrient solution may deteriorate, increasing the possibility that pH or concentration may deviate from the appropriate range.

However, one embodiment of the present disclosure, by taking the method of supplying the nutrient solution to the first cultivation unit 100 through the nutrient solution supply unit 300 and transferring the nutrient solution of the first cultivation unit 100 to the second cultivation unit 200 through the nutrient solution transferring unit 400, may reduce the total amount of nutrient solution used in the mixing tank 50 to provide the nutrient solution to the first cultivation unit 100 and the second cultivation unit 200, thereby enabling efficient use of the nutrient solution and minimizing deterioration of the nutrient solution.

Meanwhile, the nutrient solution provided to the second cultivation unit 200 may be recovered into the mixing tank 50 through the nutrient solution recovery unit 500. The nutrient solution recovery unit 500 may be provided in the second cultivation unit 200, but the nutrient solution recovery unit 500 may be directly connected to the second cultivation unit 200 or indirectly connected through a separate configuration corresponding to a medium.

In addition, the nutrient solution recovery unit 500 may be a means of transferring the nutrient solution of the second cultivation unit 200 to the mixing tank 50 on the nutrient solution flow path while being spaced apart from the second cultivation unit 200. In other words, the nutrient solution recovery unit 500 may be a means of conceptually connecting the second cultivation unit 200 and the mixing tank 50 based on the flow path of the nutrient solution.

One embodiment of the present disclosure supplies the nutrient solution supplied from the mixing tank 50 only to the first cultivation unit 100, and recovers only the nutrient solution discharged from the second cultivation unit 200 to the mixing tank 50, and thus a circulation supply unit with an efficient structure may be formed.

In other words, one embodiment of the present disclosure, by omitting a separate flow path for supplying the nutrient solution to the second cultivation unit 200 and omitting a separate flow path for recovering the nutrient solution discharged from the first cultivation unit 100, is efficient because the flow-related structure of the nutrient solution may be easily improved, and furthermore, it is advantageous because additional components such as valves that occur when adding a flow path or the like may also be omitted.

Figure 8:
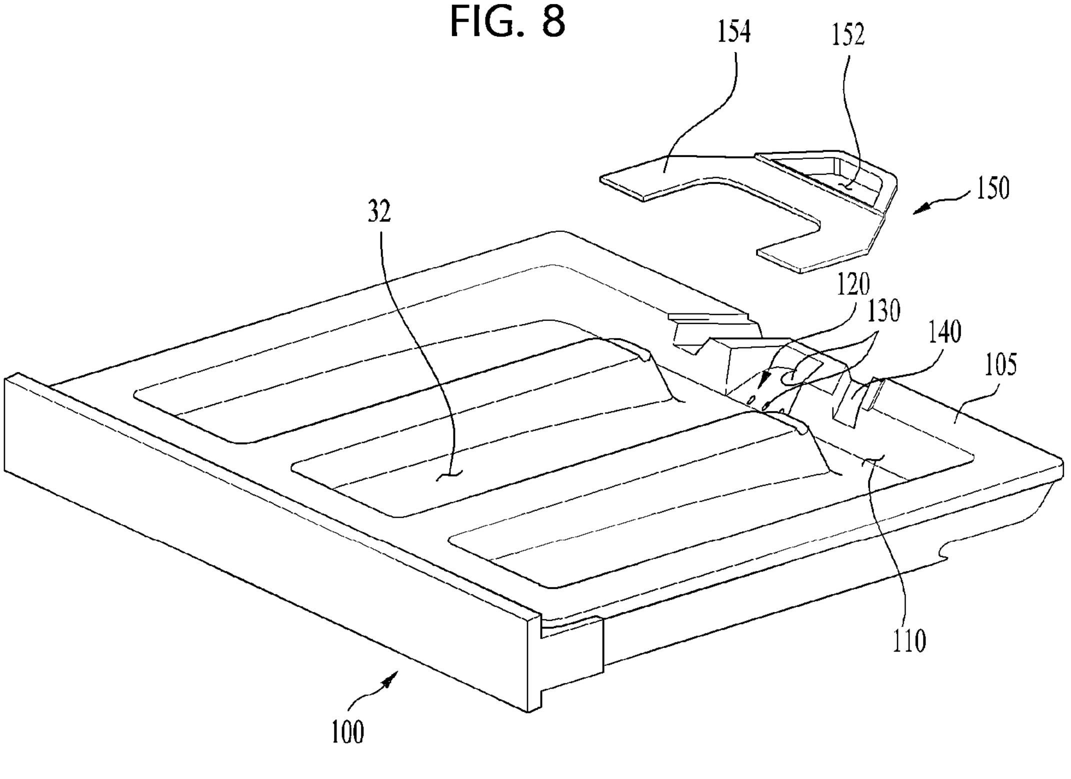
FIG. 8 is a diagram illustrating the first cultivation unit with the first inlet separated in an embodiment of the present disclosure.

Meanwhile, FIG. 7 illustrates a nutrient solution supply unit 300 including a supply hole 320 according to an embodiment of the present disclosure, and FIG. 8 illustrates the first inlet 150 of the first cultivation unit 100 in which the nutrient solution discharged from the supply hole 320 is collected.

Referring to FIGS. 7 and 8, in one embodiment of the present disclosure, the nutrient solution supply unit 300 includes a supply hole 320 through which the nutrient solution is discharged, and the first inlet 150 is provided in the first cultivation unit 100 and located below the supply hole 320, so that the first inlet may receive the nutrient solution falling from the supply hole 320 and supply the nutrient solution to the inside of the first cultivation unit 100.

The supply hole 320 through which the nutrient solution is discharged from the nutrient solution supply unit 300 may be provided on the supply flow path 310, and the nutrient solution discharged from the supply hole 320 may be supplied to the first cultivation unit 100. The first cultivation unit 100 may include a first inlet 150 to receive the nutrient solution discharged from the supply hole 320. The first inlet 150 is provided in the first cultivation unit 100 to collect the nutrient solution discharged from the supply hole 320, and may transfer the collected nutrient solution to the first accommodation space 110 of the first cultivation unit 100.

One embodiment of the present disclosure, by taking a method in which the nutrient solution supply unit 300 discharges the nutrient solution through the supply hole 320, may effectively reduce the load on the supply pump 55, and, by collecting the nutrient solution discharged from the supply hole 320 by the first inlet 150, may suppress the scattering of the nutrient solution and effectively implement the falling method of the nutrient solution.

Meanwhile, referring to FIGS. 7 and 8, the first inlet 150 is provided to be detachable from the first cultivation unit 100, and the first cultivation unit 100 is removed, the nutrient solution falling from the supply hole 320 may be bypassed and supplied to the nutrient solution transferring unit 400.

The first inlet 150 is provided in a form that is seated or inserted into the first cultivation unit 100 and may be separated from the first cultivation unit 100. When the first inlet 150 is separated from the first cultivation unit 100, the nutrient solution supplied from the nutrient solution supply unit 300 may bypass the first cultivation unit 100 and the nutrient solution may not be transferred.

The plant cultivation apparatus 1 according to an embodiment of the present disclosure may include a plurality of cultivation units 30, and the user may wish to use only some of the plurality of cultivation units 30 as needed.

For example, the first cultivation unit 100 and the second cultivation unit 200 are spaced apart vertically, and the user places plants only in the second cultivation unit 200 without placing plants in the upper first cultivation unit 100 and thus may use only the second cultivation unit 200.

In this case, the user simply and effectively prevents the nutrient solution from being provided to the first cultivation unit 100 by simply removing the first inlet 150 removably installed in the first cultivation unit 100, and only the second cultivation unit 200 may be used.

In other words, in one embodiment of the present disclosure, the nutrient solution supply unit 300 can effectively reduce the load on the supply pump 55 by dropping the nutrient solution through the supply hole 320, and the first cultivation unit 100 has the first inlet 150 to be detachable, which is located below the supply hole 320 and collects the nutrient solution discharged from the supply hole 320, so that when the first inlet 150 is removed, the nutrient solution effectively provided from the nutrient solution supply unit 300 may bypass the first cultivation unit 100 and be provided to the second cultivation unit 200.

As illustrated in FIGS. 7 and 8, the first inlet 150 is located at least partially protruding outside the first cultivation unit 100, and the supply hole 320 of the nutrient solution supply unit 300 is located above the first inlet 150 on the outside of the first cultivation unit 100, so that the nutrient solution can fall into the first inlet 150.

In the above structure, when the first inlet 150 is removed from the first cultivation unit 100, the nutrient solution falling from the nutrient solution supply unit 300 can easily bypass the first cultivation unit 100, and thus, whether to use the first cultivation unit 100 can be conveniently determined according to the user's convenience.

Meanwhile, FIG. 7 illustrates a first collection unit 410, at least part of which is located below the supply hole 320 of the nutrient solution supply unit 300, according to an embodiment of the present disclosure, and FIG. 15, which will be described later, illustrates a nutrient solution transferring unit 400 including a first collection unit 410 is illustrated.

In one embodiment of the present disclosure, the nutrient solution transferring unit 400 is at least partially located below the first inlet 150 mounted on the first cultivation unit 100, and thus when the first inlet 150 is removed, the nutrient solution transferring unit 400 receives the nutrient solution which bypasses the first cultivation unit 100 and falls and may supply the nutrient solution to the second cultivation unit 200.

At least a portion of the nutrient solution transferring unit 400 may be located below the first inlet 150. In other words, when the first inlet 150 is removed, at least a portion of the nutrient solution transferring unit 400, for example, a portion of the first collection part 410, which will be described later, is located below and thus may be directly faced to the supply hole 320.

One embodiment of the present disclosure may be disposed in the vertical direction in the order of the supply hole 320, the first inlet 150, and the nutrient solution transferring unit 400, and in a state where the first inlet 150 is seated on the first cultivation unit 100, the nutrient solution falling from the nutrient solution supply unit 300 is provided to the first inlet 150, so the nutrient solution transferring unit 400 does not directly receive the nutrient solution.

However, when the first inlet 150 is removed, the nutrient solution falling from the nutrient solution supply unit 300 is directly transferred to the nutrient solution transferring unit 400 located below the supply hole 320, so the bypass function of the first cultivation part 100 may be effectively implemented and the nutrient solution may be effectively provided to the second cultivation unit 200 at the same time.

In other words, one embodiment of the present disclosure has a structure in which the nutrient solution supply unit 300 supplies the nutrient solution through a falling method, and the first cultivation unit 100 receives the nutrient solution through the first inlet 150, and thus, whether to bypass the first cultivation unit 100 may be determined simply by installing and separating the first inlet 150. Convenience of use thereof may be improved.

Meanwhile, FIG. 8 illustrates the first discharge hole 130 provided in the first cultivation unit 100, and in FIG. 11, which will be described later, the first discharge hole 130 of the first cultivation unit 100 is enlarged. It is illustrated. In one embodiment of the present disclosure, the first cultivation unit 100 may include a first discharge hole 130 through which the inner nutrient solution is discharged to the outside.

The first discharge hole 130 may discharge the nutrient solution provided in the first accommodation space 110 to the outside of the first cultivation unit 100. In other words, the first discharge hole 130 may penetrate the first distribution unit 100 to communicate with the first accommodation space 110 and the outside of the first distribution unit 100, and the nutrient solution of the first accommodation space 110 may be discharged to the outside of the first cultivation unit 100 through the first discharge hole 130.

In one embodiment of the present disclosure, the first cultivation unit 100 discharges the nutrient solution in a falling manner using the own weight thereof through the first discharge hole 130, and thus even if it is not directly connected to the supply pump 55, the flow of nutrient solution may be effectively formed.

Figure 15:
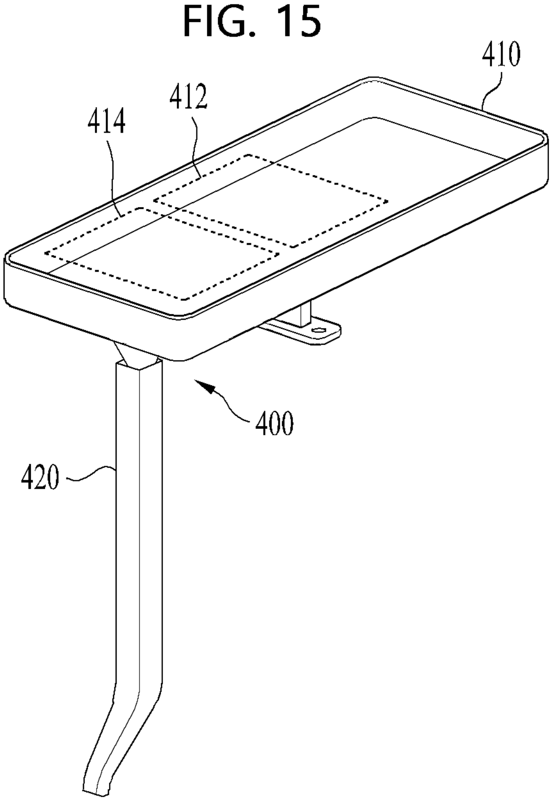
FIG. 15 is a view illustrating a nutrient solution transferring unit in a plant cultivation apparatus according to an embodiment of the present disclosure.

Meanwhile, FIG. 7 illustrates the first collection unit 410 of the nutrient solution transferring unit 400, and FIG. 15 conceptually illustrates the first general collection area 412 and the second additional collection area 514 of the first collection.

In one embodiment of the present disclosure, the nutrient solution transferring unit 400 may include a first collection unit 410, and the first collection unit 410 thus may include the first general collection area 412 which is located below the fist discharge hole 130 and where the nutrient solution falling from the first discharge hole 130 is collected and a first additional collection area 414 which is located below the first inlet 150 mounted on the first cultivation unit 100 and where the nutrient solution that falls by bypassing the first cultivation unit 100 is collected.

As described above, the nutrient solution from the first cultivation unit 100 is transferred to the second cultivation unit 200 through the nutrient solution transferring unit 400, and the first cultivation unit 100 discharges the nutrient solution through a first discharge hole 130, the first collection part 410 of the nutrient solution transferring unit 400 includes a first general collection area 412 where the nutrient solution discharged from the first discharge hole 130 is collected. The first general collection area 412 is located below the first discharge hole 130 and may collect the nutrient solution discharged from the first discharge hole 130.

Meanwhile, the first collection unit 410 may directly collect the nutrient solution discharged from the nutrient solution supply unit 300 when the first inlet 150 is removed from the first cultivation unit 100. Accordingly, the first collection unit 410 may further include a first additional collection area 414 which is located below the nutrient solution supply unit 300 in addition to the first general collection area 412 and is for collecting the nutrient solution discharged from the supply hole 320.

The first collection unit 410 may have the shape of a box with an internal space opening upward, or may be provided as a panel type with a recessed shape centered around an opening through which the collected nutrient solution is discharged.

The first collection unit 410 may be designed to be structurally divided into a first general collection area 412 and a first additional collection area 414, but may be divided locationally, conceptually, and functionally such as the portion located below the first discharge hole 130 and the portion located below the supply hole 320.

In one embodiment of the present disclosure, the first collection unit 410, where the nutrient solution is collected from the nutrient solution transferring unit 400, includes a first general collection area 412 and a first additional collection area 414, and thus, in addition to the nutrient solution discharged from the first cultivation unit 100, the nutrient solution that bypasses the first cultivation unit 100 and falls directly from the supply hole 320 can also be effectively collected and transferred to the second cultivation unit 200.

The second collection unit 510 of the nutrient solution recovery unit 500, which will be described later, may include a second general collection area 512 and a second additional collection area 514, similar to the first collection unit 410, and the characteristics related to the second general collection area 512 and the second additional collection area 514 may be the same as the first general collection area 412 and the first additional collection area 414 described above.

Meanwhile, in one embodiment of the present disclosure, the second cultivation unit 200 is located below the first cultivation unit 100, and the nutrient solution transferring unit 400 uses the self-weight of the nutrient solution to transfer the nutrient solution from the first cultivation unit 100 to the second cultivation unit 200.

In other words, in one embodiment of the present disclosure, the supply pump 55 is only involved in transferring the nutrient solution in the mixing tank 50 onto the first cultivation unit 100, and transferring of the nutrient solution from the first cultivation unit 100 to the second cultivation unit 200 or transferring of the nutrient solution from the second cultivation unit 200 to the mixing tank 50 may use a falling method using the self-weight of the nutrient solution.

For example, the nutrient solution supply unit 300 discharges the nutrient solution through the supply hole 320, and the first cultivation unit 100 receives nutrient solution through the first inlet 150 located below the supply hole 320, the nutrient solution transferring unit 400 is located below the first discharge hole 130 and the supply hole 320 of the first collection unit 410 of the first cultivation unit 100 to receive the nutrient solution that fall. Receives the liquid, and the second cultivation unit 200 is located below the nutrient solution transferring unit 400 and receives the nutrient solution flowing by own weight thereof from the nutrient solution transferring unit 400, and the nutrient solution recovery unit 500 is located below the second cultivation unit 200 and receives the nutrient solution discharged from the second cultivation unit 200, and the mixing tank 50 is located below the nutrient solution recovery unit 500 and receives the nutrient solution flowing by own weight thereof from the liquid recovery unit 500.

Meanwhile, FIG. 15 illustrates the nutrient solution transferring unit 400 of the plant cultivation apparatus 1 according to an embodiment of the present disclosure. Referring to FIG. 15, in one embodiment of the present disclosure, the nutrient solution transferring unit 400 may include a first collection unit 410 and a transferring flow path 420.

The first collection unit 410 is located below the first cultivation unit 100 and may collect the nutrient solution discharged from the first cultivation unit 100, and the transferring flow path 420 extends downward from the first collection unit 410 and thus the nutrient solution collected in the first collection unit 410 may flow toward the second cultivation unit 200.

As described above, in one embodiment of the present disclosure, the nutrient solution of the first cultivation unit 100 may be transferred to the second cultivation unit 200 through flow using own weight thereof. For this purpose, the first collection unit 410 of the nutrient solution transferring unit 400 is located below the first cultivation unit 100 to collect the nutrient solution falling from the first discharge hole 130 of the first cultivation unit 100.

The second cultivation unit 200 may be located lower than the first collection unit 410. The transferring flow path 420 extends downward from the first collection unit 410 toward the second cultivation unit 200 so that the nutrient solution collected in the first collection unit 410 may flow downward through own weight thereof.

Meanwhile, in FIGS. 6 and 8 described above, the second inlet 250 of the second cultivation unit 200 is illustrated. In one embodiment of the present disclosure, the second inlet 250 is provided in the second cultivation unit 200 and is located below the transferring flow path 420 and thus receives the nutrient solution discharged from the transferring flow path 420 to supply the nutrient solution to the inside of the second cultivation unit 200.

The second inlet 250 may be installed separably on the second cultivation unit 200 in the same or similar manner as the first inlet 150. The second inlet 250 may have a shape that protrudes outward from the second cultivation unit 200 and is located below the transferring flow path 420 so that the nutrient solution discharged from the transferring flow path 420 can be collected.

The second inlet 250 is provided to be detachable from the second cultivation unit 200, and when the second inlet 250 is removed from the second cultivation unit 200, the nutrient solution falling from the transferring flow path 420 may be bypassed and supplied to the nutrient solution recovery unit 500.

The bypass-related characteristics of the second cultivation unit 200 by the second inlet 250 are generally the same as the characteristics of the first inlet 150 described above. In other words, the second inlet 250 is installed to be separable in the second cultivation unit 200, and in a state where the second inlet 250 is installed, the second cultivation unit 200 may receive the nutrient solution discharged through the transferring flow path 420 via the second inlet 250, and in a state where the second inlet 250 is separated, the second cultivation unit 200 may bypass the nutrient solution discharged from the transferring flow path 420 to direct transfer to the nutrient solution recovery unit 500.

The second cultivation unit 200 includes a second discharge hole through which the inner nutrient solution is discharged to the outside, and the nutrient solution recovery unit 500 may include a second collection part 510.

The second collection unit 510 may include a second collection area which is located below the second discharge hole and where the nutrient solution falling from the second discharge hole is collected and a second additional collection area 514 which is located below the second inlet 250 mounted on the second cultivation unit 200 and where the nutrient solution that falls by bypassing the second cultivation unit 200 is collected.

In other words, the nutrient solution recovery unit 500 collects the nutrient solution discharged from the second cultivation unit 200 in the second general collection area 512 of the second collection unit 510 and collects the nutrient solution bypassing the second cultivation unit 200 in the second additional collection area 514 and may recover the nutrient solution to the mixing tank 50. In one embodiment of the present disclosure, the second collection unit 510 may include the same features as the first collection unit 410 described above, unless otherwise specified.

Figure 16:
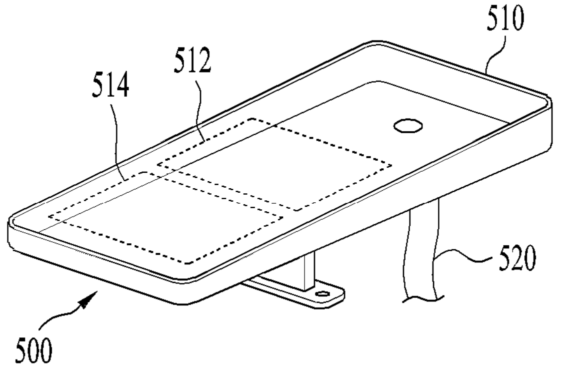
FIG. 16 is a view illustrating a nutrient solution recovery unit in the plant cultivation apparatus according to an embodiment of the present disclosure.

Meanwhile, FIG. 16 illustrates a nutrient solution recovery unit 500 according to an embodiment of the present disclosure. The nutrient solution recovery unit 500 may include a second collection unit 510 and a recovery flow path 520. The second collection unit 510 may include a second general collection area 512 where the nutrient solution discharged from the second discharge hole of the second cultivation unit 200 is collected and a second additional collection area 514 where the nutrient solution discharged from the nutrient solution transferring unit 400 and bypassing the second cultivation unit 200 is collected.

The second collection unit 510 may be connected to the recovery flow path 520. The recovery flow path 520 is connected to the bottom surface of the second collection unit 510, so that the nutrient solution collected in the second collection unit 510 may flow along the recovery flow path 520 through own weight thereof.

Referring to FIG. 6, the recovery flow path 520 of the nutrient solution recovery unit 500 may extend from the second collection unit 510 toward the mixing tank 50. In other words, the recovery flow path 520 may connect the second collection unit 510 and the mixing tank 50. The recovery flow path 520 may indirectly or directly connect the second collection unit 510 and the mixing tank 50.

Figure 11:
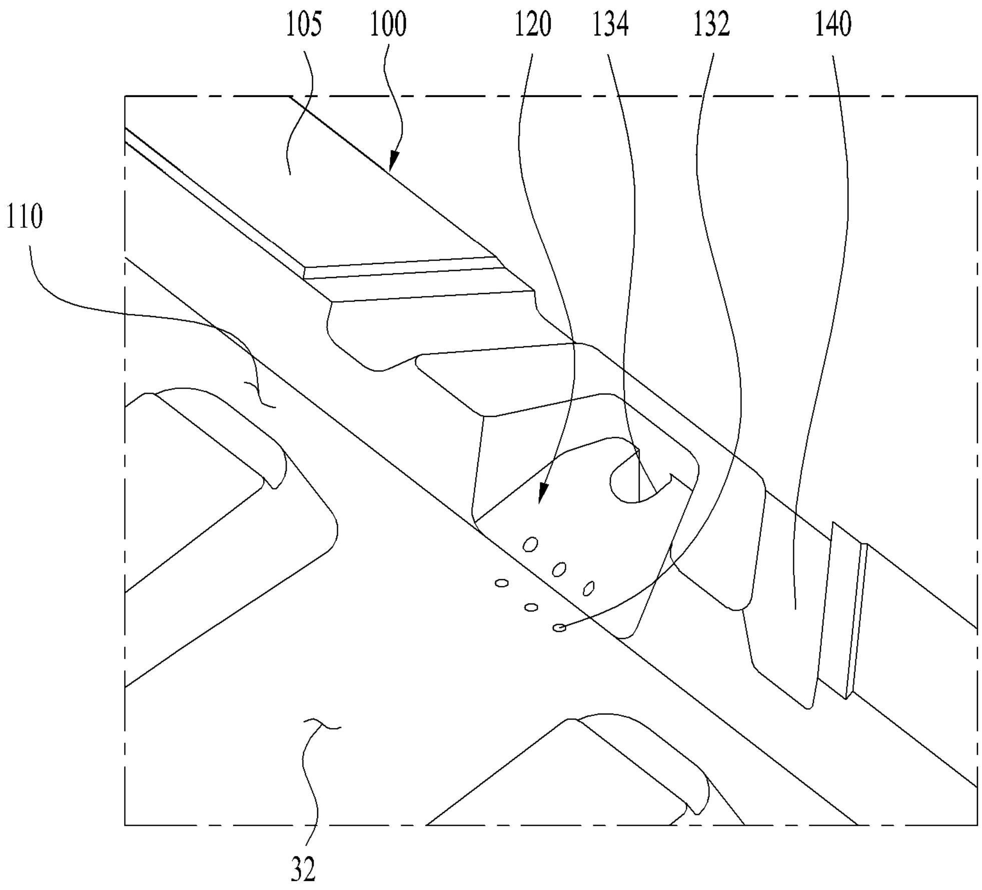
FIG. 11 is a view illustrating the inclined part and the first flow path groove of the first cultivation unit according to an embodiment of the present disclosure.

Meanwhile, FIG. 11 illustrates a first discharge hole 130 formed in the plant cultivation apparatus 1 according to an embodiment of the present disclosure. The characteristics of the first discharge hole 130 are the same as those of the second discharge hole provided in the second cultivation unit 200, unless otherwise specified.

In one embodiment of the present disclosure, as described above, the first cultivation unit 100 includes a first discharge hole 130 through which the nutrient solution is discharged to the outside of the first cultivation unit 100, and at least a portion of the nutrient solution transferring unit 400 is located below the first discharge hole 130 and may collect the nutrient solution falling from the first discharge hole 130 and transfer the nutrient solution to the second cultivation unit 200.

The first cultivation unit 100 may include a first accommodation space 110 in which the nutrient solution supplied from the nutrient solution supply unit 300 is stored, and the first discharge hole 130 may include a first general hole 132 which is located at the lowest portion of the first accommodation space 110 and a first overflow hole 134 which is located above the first general hole 132 and discharges nutrient solution above the standard water level of the first accommodation space 110.

Referring to FIG. 11, the first general hole 132 is in communication with the first accommodation space 110 and is provided in plural numbers so that the nutrient solution stored in the first accommodation space 110 may be discharged. The first general hole 132 may be located at the lowest portion of the first accommodation space 110 so that all of the nutrient solution in the first accommodation space 110 may be discharged.

The lowest portion refers to a portion located at the lowest level in the first accommodation space 110, and in FIG. 11, the first general hole 132 located at the bottom surface of the first accommodation space 110 in the first cultivation unit 100 according to an embodiment of the present disclosure is illustrated.

The first overflow hole 134 may be located above the first general hole 132 and may serve as a means for setting the allowable water level or standard water level of the first accommodation space 110.

In other words, the first overflow hole 134 is located to have a height corresponding to the standard water level based on the lowest portion of the first accommodation space 110, and the nutrient solution which is provided to the first accommodation space 110 at the standard water level or more may be discharged to the outside of the first cultivation unit 100 through the first overflow hole 134 and collected by the first collection unit 410.

Meanwhile, in one embodiment of the present disclosure, the first cultivation unit 100 is inclined upward as it moves away from the lowest portion and may include an inclined part 120 on which the first general hole 132 and the first overflow hole 134 are provided.

The inclined part 120 may be provided in the first cultivation unit 100 as well as the second cultivation unit 200. The first discharge hole 130 of the first cultivation unit 100 may be located in the inclined part 120. The inclined part 120 may be formed on the first peripheral wall 105 that extends along the perimeter of the first cultivation unit 100 and surrounds the first accommodation space 110.

The inclined part 120 may be inclined to face upward as the distance from the first accommodation space 110 increases. In other words, the inclined part 120 may be inclined to be located upward as it approaches the outside of the first cultivation portion 100.

In one embodiment of the present disclosure, inclined parts 120 are formed in the first cultivation unit 100 and the second cultivation unit 200, respectively, thereby forming a first discharge hole 130 and a second discharge hole that may include a plurality of openings with minimal bending or bending.

Meanwhile, in the first discharge hole 130, the total amount of the nutrient solution per standard hour discharged through the first general hole 132 may be smaller than the total amount per standard hour of the nutrient solution supplied from the nutrient solution supply unit 300.

In other words, the first cultivation unit 100 increases the nutrient solution stored in the first accommodation space 110 in a situation where the nutrient solution is supplied from the nutrient solution supply unit 300, and when the supply of the nutrient solution from the nutrient solution supply unit 300 is stopped, the nutrient solution in the first accommodation space 110 may be discharged through the first general hole 132 as much as the total discharge amount per standard time.

In a method such as hydroponic cultivation in which a nutrient solution is provided to plants by providing a cultivation container 35 or the like in the first accommodation space 110 where the nutrient solution is stored, the nutrient solution needs to be provided for a certain period of time so that the nutrient solution is sufficiently added to soil materials such as plants or media.

In addition, the nutrient solution in the first accommodation space 110 needs to be discharged from the first accommodation space 110 after a predetermined period of time to prevent plants from being submerged in the nutrient solution for an excessively long period of time and thereby hindering their growth.

In one embodiment of the present disclosure, a plurality of first general holes 132 may be provided as needed, and the total amount of nutrient solution discharged per unit time may be determined by design by adjusting the diameter. When a plurality of first general holes 132 are provided, the total amount refers to the amount of nutrient solution discharged through all of the plurality of first general holes 132.

One embodiment of the present disclosure may set the time required for complete discharge of the nutrient solution provided in the first accommodation space 110 through a design determination of the first general hole 132, and through this, even without a separate valve which determines the discharge amount of the nutrient solution, the nutrient solution may be efficiently provided within the first accommodation space 110 for the required amount of time.

In addition, one embodiment of the present disclosure makes the supply amount of nutrient solution per unit time from the nutrient solution supply unit 300, which is determined through operation control of the supply pump 55, higher than the discharge amount per unit time from the first general hole 132, and thus even if there is a first general hole 132 that is always open, it is possible to effectively provide a nutrient solution equal to the standard water level to the first accommodation space 110.

As described above, in one embodiment of the present disclosure, the first general hole 132 may be designed to have a small diameter so that the nutrient solution may exist in the first accommodation space 110 for a predetermined period of time.

For example, in one embodiment of the present disclosure, the diameter of the first general hole 132 may be smaller than the diameter of the first overflow hole 134. In other words, the first overflow hole 134 may have a relatively large diameter to quickly resolve the storage of nutrient solution by the standard water level or more in the first accommodation space 110, and the first general hole 132 may have a small diameter so that the nutrient solution may exist in the first accommodation space 110 for a experimentally or statistically determined time.

Figure 12:
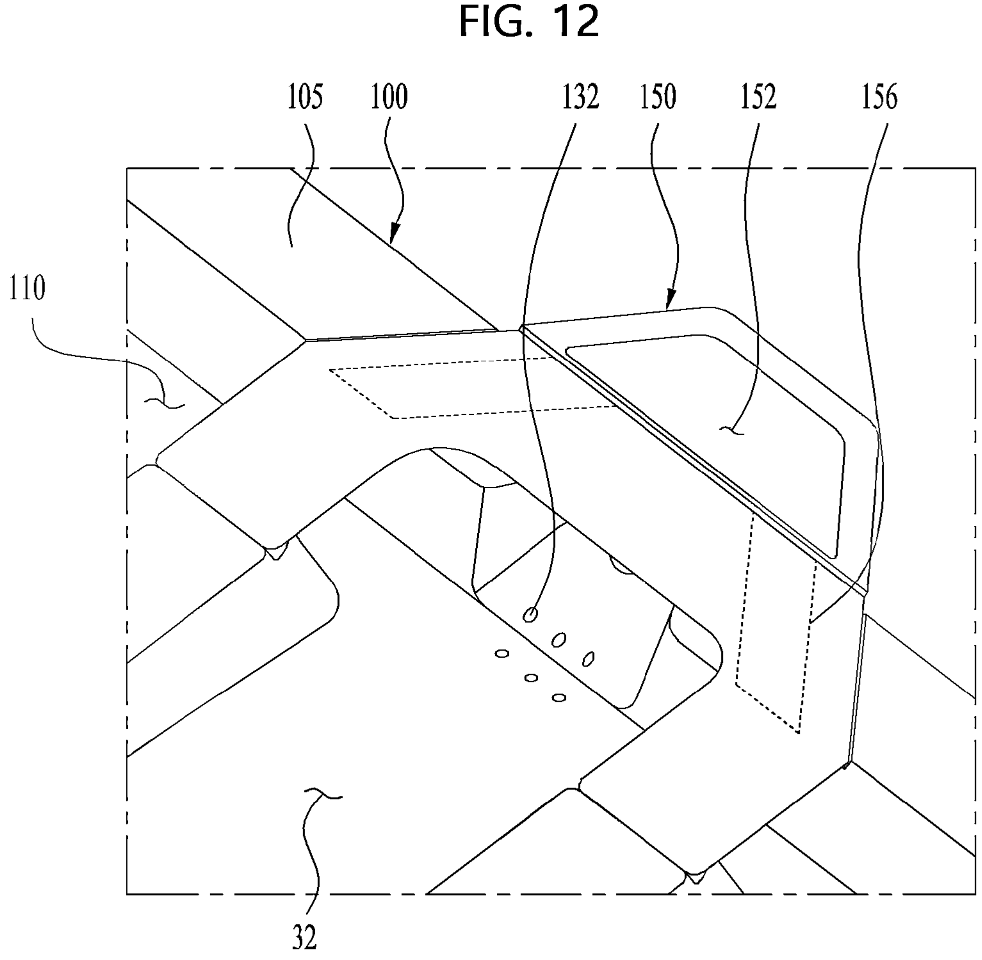
FIG. 12 is a view illustrating the first inlet seated in the first flow groove of the first cultivation part in one embodiment of the present disclosure.

Meanwhile, FIG. 12 illustrates a first inlet 150 coupled to the first cultivation unit 100 according to an embodiment of the present disclosure. Referring to FIG. 12, the first cultivation unit 100 has a first accommodation space 110 where the nutrient solution supplied from the nutrient solution supply unit 300 is accommodated and a first peripheral wall 105 extending along the perimeter of the first accommodation space 110, and at least a portion of the first inlet 150 extends outward from the first peripheral wall 105 and may be located below the supply hole 320.

The first accommodation space 110 may be defined by the bottom surface of the first cultivation unit 100 and the first peripheral wall 105. The above-described first general hole 132 may be located on the bottom surface. At least a portion of the first inlet 150 may be located outside the first cultivation unit 100 rather than the first peripheral wall 105.

In other words, the supply hole 320 of the nutrient solution supply unit 300 is located outside the first peripheral wall 105 of the first cultivation unit 100, so that, even if the first inlet 150 is removed, it is possible to prevent the nutrient solution discharged from the supply hole 320 flowing into the interior of the first cultivation unit 100.

Meanwhile, as described above, the second cultivation unit 200 may include the same features as the first cultivation unit 100 unless otherwise specified. In other words, the second cultivation unit 200 may be defined within the second accommodation space 210 in the same way as the first distribution unit 100. The second accommodation space 210 may be defined by the bottom surface of the second cultivation unit 200 and the second peripheral wall 205.

The second inlet 250 of the second cultivation unit 200 may be provided to collect the nutrient solution falling from the nutrient solution transferring unit 400, may be formed to protrude outward from the second cultivation unit 200, and may be seated on the second peripheral wall 205. The second inlet 250 may include the same characteristics as the first inlet 150 unless otherwise specified.

Meanwhile, referring to FIG. 12, in one embodiment of the present disclosure, the first inlet 150 may include a shielding unit 154 that shields at least a portion of the open upper surface of the first accommodation space 110.

As described above, the first inlet 150 may be provided to protrude outward from the first cultivation unit 100 beyond the first peripheral wall 105, and a portion of the first inlet 150 may be seated on the first peripheral wall 105. Furthermore, the first inlet 150 may include a shielding unit 154 located on the upper surface of a portion of the first accommodation space 110 defined inside the first peripheral wall 105.

The shielding unit 154 may be provided to shield a portion of the open upper surface of the first accommodation space 110. Accordingly, the portion of the first accommodation space 110 that is covered by the shielding unit 154 may be blocked from entering light from the outside by the shielding unit 154, and it may be suppressed that light is provided to the nutrient solution accommodated inside the first receiving space 110 and thus the green algae or the like may be generated.

Figure 13:
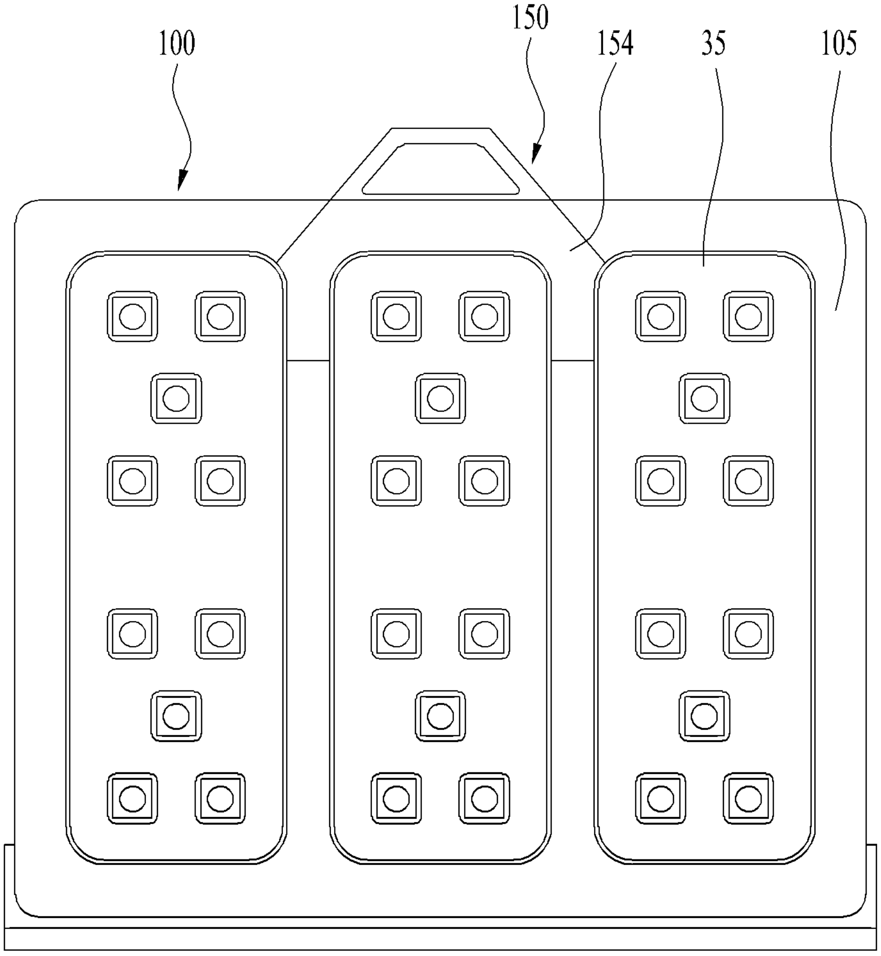
FIG. 13 is a top view illustrating a first cultivation unit equipped with a cultivation container and a first inlet in one embodiment of the present disclosure.
Figure 14:
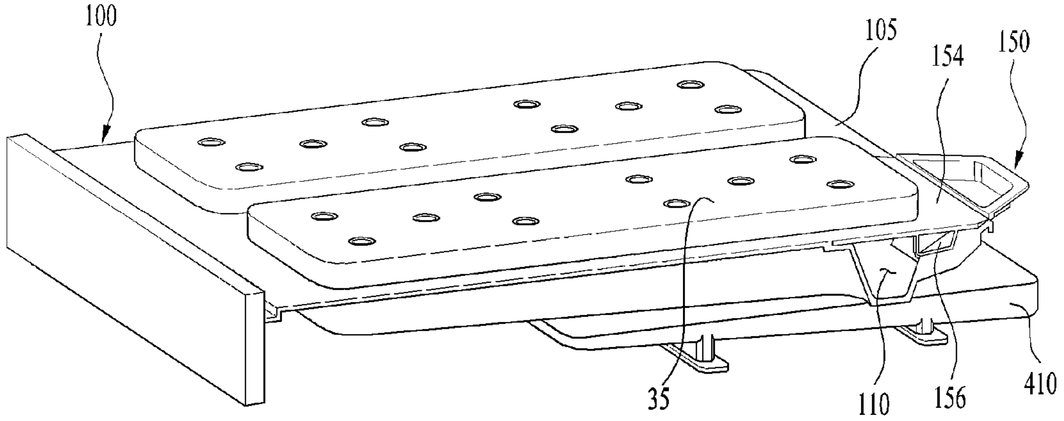
FIG. 14 is a cross-sectional view illustrating the first cultivation unit of FIG. 13 viewed from the side.

Meanwhile, FIG. 13 illustrates a state where a cultivation container 35 is disposed in the container space 32 of the first accommodation space 110, and FIG. 14 illustrates a cross-section of the first cultivation unit 100 of FIG. 13 viewed from the side.

Referring to FIGS. 13 and 14, in one embodiment of the present disclosure, the first accommodation space 110 includes a container space 32 in which a cultivation container 35 containing at least a portion of the plant is seated, and the shielding unit 154 may be disposed to shield the open upper surface of the remaining space in the first accommodation space 110 except for the container space 32.

As described above, the first accommodation space 110 may be defined by the bottom surface of the first cultivation unit 100 and the first peripheral wall 105, and a container space 32 in which a cultivation container 35 is seated may be defined in a portion of the first accommodation space 110.

The cultivation container 35 is equipped with at least a portion of the plant such as seeds, a medium corresponding to the soil material, and the like, and the cultivation container 35 is provided in the first accommodation space 110 and thus a nutrient solution in the first accommodation space 110 may be provided to the plants inside the cultivation container 35.

The shielding unit 154 of the first inlet 150 may serve as a means of covering the open upper portion of the first accommodation space 110 from the outside, and thus the shielding unit 154 of the first inlet 150 may be provided to shield the upper surface open to the first accommodation space 110 excluding the container space 32.

Meanwhile, in the first cultivation unit 100, a cultivation container 35 in which at least a portion of the plant is stored is accommodated in the first accommodation space 110, and the first accommodation space 110 has the entire open upper surface which may be shielded by the shielding unit 154 and the cultivation container 35.

The first peripheral wall 105 may include a protruding wall for defining the container space 32 in the first accommodation space 110. For example, the first peripheral wall 105 has a shape that corresponds to the shape of the cultivation container 35 and may be provided on the first cultivation unit 100. Accordingly, the user can conveniently insert the cultivation container 35 into the first accommodation space 110 by considering the shape of the first peripheral wall 105.

The open upper surface of the first accommodation space 110 may be entirely shielded from the outside by the cultivation container 35 and the shielding unit 154. The nutrient solution inside the first accommodation space 110 is blocked from transferring light from the outside by the cultivation container 35 and the shielding unit 154, so that the occurrence of green algae or the like due to the provision of light may be effectively prevented.

FIG. 13 illustrates the first cultivation unit 100, the upper surface of which is completely shielded by the first inlet 150 and the cultivation container 35 according to an embodiment of the present disclosure, and FIG. 14 illustrates the nutrient solution existing in the first receiving space 110 in a state where the entire upper surface of FIG. 13 is shielded.

The first accommodation space 110 is provided with a deeper depth than the cultivation container 35 so that the nutrient solution may be present inside, and the bottom surface may be formed inclined toward the above-described inclined part 120 or the first general hole 132 to facilitate discharge of the nutrient solution.

Figure 9:
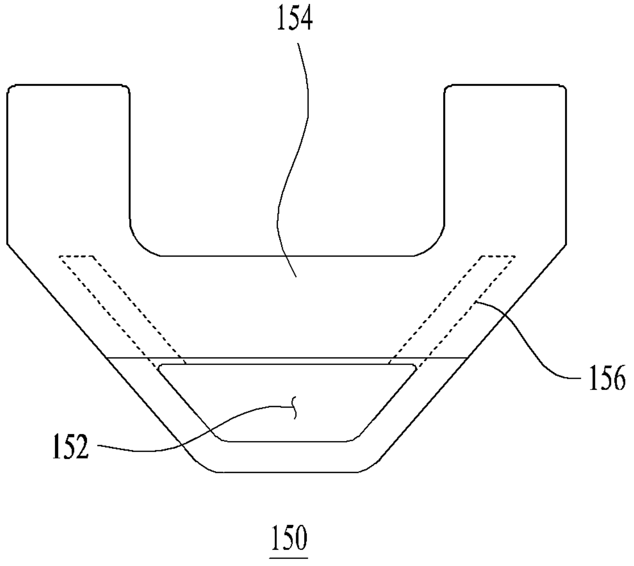
FIG. 9 is a top view of the first inlet disposed in the first cultivation unit in one embodiment of the present disclosure viewed from above.
Figure 10:
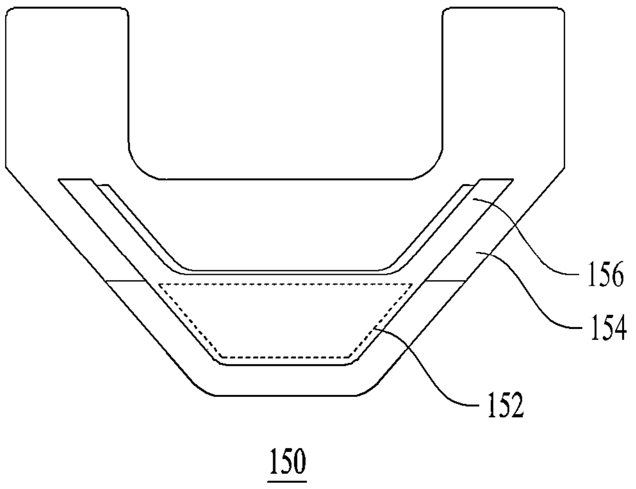
FIG. 10 is a bottom view of the first inlet disposed in the first cultivation unit in one embodiment of the present disclosure viewed from below.

Meanwhile, FIG. 9 illustrates a top view of the first inlet 150, and FIG. 10 illustrates a bottom view of the first inlet 150. Referring to FIGS. 9 and 10, in one embodiment of the present disclosure, the first inlet 150 may further include a recessed space 152 located below the supply hole 320 of the nutrient solution supply part 300 on the outside of the first peripheral wall 105 and an inlet flow path 156 provided on the lower side of the shielding unit 154 to communicate with the recessed space 152 and the first accommodation space 110.

The recessed space 152 may be formed by recessing the upper surface of the first inlet 150 downward. The recessed space 152 may be located outside the first cultivation unit 100. The recessed space 152 is located below the supply hole 320 of the nutrient solution supply unit 300, so that the nutrient solution discharged from the supply hole 320 may be collected in the recessed space 152.

In other words, a portion of the first inlet 150 where the recessed space 152 is formed is located on the outside of the first cultivation unit 100, and the nutrient solution collected in the recessed space 152 is transferred to the inside of the first cultivation unit 100, that is, the first accommodation space 110.

The inlet flow path 156 may be located below the shielding unit 154. The inlet flow path 156 may be formed to protrude downward from the shielding unit 154. In other words, the inlet flow path 156 may be covered from the outside by the shielding unit 154. The inlet flow path 156 may extend from the recessed space 152 toward the first accommodation space 110.

The first inlet 150 allows the nutrient solution present in the recessed space 152 to be transferred to the first accommodation space 110 through the inlet flow path 156. In other words, the nutrient solution provided in the recessed space 152 may flow through the inlet flow path 156 and be transferred into the first accommodation space 110.

The inlet flow path 156 may be located spaced apart from the first discharge hole 130 or the inclined part 120. Additionally, the inlet flow path 156 may discharge the nutrient solution at a location spaced apart from the first discharge hole 130 or the inclined part 120.

In one embodiment of the present disclosure, as the first inlet 150 transfers the nutrient solution supplied from the nutrient solution supply unit 300 through the inlet flow path 156 located below the shielding unit 154 into the first accommodation space 110, the nutrient solution collected in the first inlet 150 may be provided inside the first accommodation space 110 without being exposed to the outside, and the first inlet 150 shields the open upper surface of the first accommodation space 110 through the shielding unit 154 and at the same time, the nutrient solution in the recessed space 152 may be completely transferred to the inside of the first accommodation space 110. In FIG. 12, the inlet flow path 156 of the first inlet 150 coupled to the first cultivation unit 100 according to an embodiment of the present disclosure is indicated with a dotted line.

Meanwhile, the inlet flow path 156 protrudes downward from the shielding unit 154 and extends from the recessed space 152 toward the first accommodation space 110, and a first flow path groove 140 into which the inlet flow path 156 is inserted from above may be formed on the first peripheral wall 105.

FIG. 11 illustrates a first flow path groove 140 formed in the first peripheral wall 105. Referring to FIG. 11, the first flow path groove 140 may extend from the outside of the first cultivation unit 100 toward the inside. The first flow path groove 140 has a shape corresponding to the inlet flow path 156, and the inlet flow path 156 may be inserted and coupled from above.

One embodiment of the present disclosure includes a shielding unit 154 as the first flow groove 140 into which the inlet flow path 156 is inserted is formed in the first peripheral wall 105 of the first cultivation unit 100, and the first inlet 150 where the inlet flow path 156 is formed may be effectively coupled, and further, the first inlet 150 may be structurally and stably coupled.

Meanwhile, the first accommodation space 110 includes a container space 32 in which a cultivation container 35 containing at least a portion of the plant is seated, and the inlet flow path 156 may be connected to the remaining spaces excluding the container space 32 from the first accommodation space 110.

The first accommodation space 110 further includes a space excluding the container space 32 to secure an appropriate amount of nutrient solution, and the inlet flow path 156 is connected to the remaining spaces excluding the container space 32 from the first accommodation space 110, and thus even when the first cultivation unit 100 is equipped with the cultivation container 35, the inlet flow path may efficiently provide the nutrient solution in the first accommodation space 110.

Meanwhile, the plant cultivation apparatus 1 according to an embodiment of the present disclosure includes a cabinet 10, a first cultivation unit 100, and the second cultivation unit 200 and may include the mixing tank 50 in which the nutrient solution to be provided to the plants in the first cultivation unit 100 and the second cultivation unit 200 and a circulation supply unit that is connected to the mixing tank 50 and circulates and supplies the nutrient solution of the mixing tank 50 to the first cultivation unit 100, the second cultivation unit 200, and the mixing tank 50 in that order.

Meanwhile, the plant cultivation apparatus 1 according to an embodiment of the present disclosure includes a cabinet 10, a first cultivation unit 100 provided in the cabinet 10 and in which plants are placed, a second cultivation unit 200 provided to be spaced apart from the first cultivation unit 100 in the cabinet 10 and in which plants are placed, a nutrient solution supply unit 300 connected to the mixing tank 50 in which the nutrient solution is stored to supply the nutrient solution to the first cultivation unit 100, and a first inlet 150 provided to be detachable from the first cultivation unit 100 and transferring the nutrient solution supplied from the nutrient solution supply unit 300 into the first cultivation unit 100, in which the first cultivation unit 100 is equipped with the first inlet 150 so that the nutrient solution of the nutrient solution supply unit 300 flows into the inside thereof and the first inlet 150 is removed so that the nutrient solution from the nutrient solution supply unit 300 is bypassed and thus may be transferred to the second cultivation unit 200.

Although the present disclosure has been illustrated and described in relation to specific embodiments, it will be apparent to those skilled in the art that the present disclosure may be improved and changed in various ways, without departing from the technical spirit of the disclosure as provided by the following claims.

The invention claimed is:

1. A plant cultivation apparatus, comprising:
- a cabinet;
- a first cultivation unit provided in the cabinet and in which plants are placed;
- a second cultivation unit provided in the cabinet to be spaced apart from the first cultivation unit, and in which plants are placed;
- a nutrient solution supply unit connected to a mixing tank in which nutrient solution is stored, configured to supply the nutrient solution to the first cultivation unit, the nutrient solution supply unit including a supply hole through which the nutrient solution is discharged;
- a nutrient solution transferring unit provided in the first cultivation unit and configured to transfer the nutrient solution supplied to the first cultivation unit to the second cultivation unit;
- a nutrient solution recovery unit provided in the second cultivation unit and configured to return the nutrient solution from the second cultivation unit to the mixing tank; and
- a first inlet provided in the first cultivation unit and located below the supply hole to receive the nutrient solution falling from the supply hole and supply the nutrient solution to an inside of the first cultivation unit, wherein the first inlet is provided to be detachable from the first cultivation unit, and wherein the nutrient solution falling from the supply hole is bypassed and supplied to the nutrient solution transferring unit when the first inlet is removed from the first cultivation unit.

2. The plant cultivation apparatus of claim 1, wherein at least a portion of the nutrient solution transferring unit is located below the first inlet mounted on the first cultivation unit, so that when the first inlet is removed, the nutrient solution transferring unit receives the nutrient solution which bypasses the first cultivation unit and falls and supplies the nutrient solution to the second cultivation unit.

3. The plant cultivation apparatus of claim 2, wherein the first cultivation unit includes a first discharge hole through which the nutrient solution therein is discharged to the outside, and wherein the nutrient solution transferring unit includes a first collection unit including a first general collection area located below the first discharge hole so that the nutrient solution falling from the first discharge hole is collected and a first additional collection area located below the first inlet mounted on the first cultivation unit so that the nutrient solution which bypasses the first cultivation unit and falls is collected.

4. The plant cultivation apparatus of claim 1, wherein the second cultivation unit is located below the first cultivation unit, and wherein the nutrient solution transferring unit transfers the nutrient solution from the first cultivation unit to the second cultivation unit using self-weight of the nutrient solution.

5. The plant cultivation apparatus of claim 4, wherein the nutrient solution transferring unit includes:

a first collection unit located below the first cultivation unit to collect the nutrient solution discharged from the first cultivation unit; and a transferring flow path extending downward from the first collection unit through which the nutrient solution collected in the first collection unit flows toward the second cultivation unit.

6. The plant cultivation apparatus of claim 5, further comprising:

a second inlet provided in the second cultivation unit and located below the transferring flow path to receive the nutrient solution discharged from the transferring flow path and supply the nutrient solution to the inside of the second cultivation unit.

7. The plant cultivation apparatus of claim 6, wherein the second inlet is provided to be detachable from the second cultivation unit, and wherein the nutrient solution falling from the transferring flow path is bypassed and supplied to the nutrient solution recovery unit when the second inlet is removed from the second cultivation unit.

8. The plant cultivation apparatus of claim 7, wherein the second cultivation unit includes a second discharge hole through which the nutrient solution therein is discharged to the outside, and wherein the nutrient solution recovery unit includes a second collection unit including a second collection area located below the second discharge hole so that the nutrient solution falling from the second discharge hole is collected, and a second additional collection area located below the second inlet mounted on the second cultivation unit so that the nutrient solution that passes and falls is collected.

9. The plant cultivation apparatus of claim 1, wherein the first cultivation unit includes a first discharge hole through which the nutrient solution is discharged to the outside of the first cultivation unit, and wherein at least a portion of the nutrient solution transferring unit is located below the first discharge hole, collects the nutrient solution falling from the first discharge hole, and transfers the nutrient solution to the second cultivation unit.

10. The plant cultivation apparatus of claim 9, wherein the first cultivation unit includes a first accommodation space in which the nutrient solution supplied from the nutrient solution supply unit is stored, and wherein the first discharge hole includes a first general hole located at the lowest portion of the first accommodation space and a first overflow hole located above the first general hole and configured to discharge the nutrient solution by a standard water level or more of the first accommodation space.

11. The plant cultivation apparatus of claim 10, wherein the first cultivation part is inclined upward as it moves away from the lowest portion, and includes an inclined part in which the first general hole and the first overflow hole are provided.

12. The plant cultivation apparatus of claim 10, wherein a total amount of the nutrient solution per standard hour discharged through the first general hole of the first discharge hole is smaller than a total amount of the nutrient solution per standard hour supplied from the nutrient solution supply unit.

13. The plant cultivation apparatus of claim 10, wherein a diameter of the first general hole is smaller than a diameter of the first overflow hole.

14. The plant cultivation apparatus of claim 1, wherein the first cultivation unit is provided with a first accommodation space that accommodates the nutrient solution supplied from the nutrient solution supply unit and a first peripheral wall extending along a perimeter of the first accommodation space, and wherein at least a portion of the first inlet extends outward from the first peripheral wall and is located below the supply hole.

15. The plant cultivation apparatus of claim 14, wherein the first inlet includes a shielding unit configured to shield at least a portion of the open upper surface of the first accommodation space.

16. The plant cultivation apparatus of claim 15, wherein the first accommodation space includes a container space in which a cultivation container containing at least a portion of the plant is seated, and wherein the shielding unit is disposed to shield the open upper surface of a remaining space in the first accommodation space except for the container space.

17. The plant cultivation apparatus of claim 15, wherein a cultivation container of the first cultivation unit containing at least a portion of the plant is accommodated in the first accommodation space, and wherein an entire open upper surface of the first accommodation space is shielded by the shielding unit and the cultivation container.

18. The plant cultivation apparatus of claim 15, wherein the first inlet further includes a recessed space located below the supply hole of the nutrient solution supply unit on the outside of the first peripheral wall, and an inlet flow path provided below the shielding unit to communicate with the recessed space and the first accommodation space.

19. The plant cultivation apparatus of claim 18, wherein the inlet flow path protrudes downward from the shielding unit and extends from the recessed space toward the first accommodation space, and wherein a first flow path groove into which the inlet flow path is inserted from above is formed in the first peripheral wall.

20. The plant cultivation apparatus of claim 18, wherein the first accommodation space includes a container space in which a cultivation container containing at least a portion of the plant is seated, and wherein the inlet flow path is connected to remaining spaces in the first accommodation space excluding the container space.

* * * * *